United States Patent [19]

Myers

[11] Patent Number: 5,332,462

[45] Date of Patent: Jul. 26, 1994

[54] APPARATUS FOR ASSEMBLING FIBERGLASS GRATING FROM PULTRUDED FIBERGLASS GRATING BARS

[76] Inventor: Robert E. Myers, 18507 Prince William La., Nassau Bay, Tex. 77058

[21] Appl. No.: 941,950

[22] Filed: Sep. 8, 1992

[51] Int. Cl.$^5$ .................................. B29C 65/52
[52] U.S. Cl. ...................................... 156/353; 29/790; 29/795; 83/877; 118/323; 118/704; 156/356; 156/434; 156/517; 156/561; 156/566; 156/578; 156/580
[58] Field of Search ............... 156/353, 356, 433, 434, 156/441, 517, 529, 560, 561, 566, 578, 580, ; 118/687, 669, 681, 708, 704, 323; 226/162; 29/33 P, 430, 563, 564.2, 564.8, 795, 796, 797, 790; 83/877; 198/621, 740; 52/664, 666, 668; 144/86, 89, 136 R

[56] References Cited

U.S. PATENT DOCUMENTS

| | | | |
|---|---|---|---|
| 335,335 | 2/1886 | Byrkit | 144/89 |
| 2,384,303 | 9/1945 | Heath | 52/668 |
| 3,252,263 | 5/1966 | Korf | 52/664 |
| 3,510,040 | 5/1970 | Cleland et al. | 226/162 |
| 3,851,384 | 12/1974 | Kellner et al. | 29/564.2 |
| 3,877,690 | 4/1975 | Owens | 226/162 |
| 4,010,203 | 3/1977 | Aylon | 156/578 |
| 4,289,563 | 9/1981 | Wiechowski et al. | 156/566 |
| 4,295,918 | 10/1981 | Benson et al. | 156/434 |
| 4,312,469 | 1/1982 | Nilsson | 226/162 |

FOREIGN PATENT DOCUMENTS

| | | | |
|---|---|---|---|
| 1000921 | 10/1951 | France | 118/323 |
| 926407 | 5/1963 | United Kingdom | 52/668 |

Primary Examiner—Michael W. Ball
Assistant Examiner—Steven D. Maki
Attorney, Agent, or Firm—Sughrue, Mion, Zinn, Macpeak & Seas

[57] ABSTRACT

An apparatus for assembling a fiberglass reinforced grating from preformed bearing bars and cross bars includes an elongated open frame table having a plurality of rollers in side-by-side fashion with their axes transverse to the longitudinal axis of the table and supporting a set of upwardly upright transversely spaced bearing bars on the peripheries of the rollers. A loading rack formed of vertically upright transversely spaced spacing and alignment pins controls the lateral spacing of the bearing bars. A raisable stop upstream of a grooving station aligns the ends of the bearing bars. A vertically shiftable hold press hold down bar operates alternately with a vertically shiftable car press hold down bar and the car press is incremented which frictionally presses the bearing bars against the tabletop rollers to increment the set of bearing bars upon release of the hold press hold down bar. A transversely movable grooving head has a pair of rotary saw blades offset transversely and having slightly crossed tips to form X-shaped grooves or notches within the tops of the bearing bars. A glue application unit selectively drips liquid adhesive onto the notches. A hydraulic tie bar press presses a cross bar having outwardly flared resilient legs into the inverted V-shaped notches on the tie bars to mechanically interlock the cross bars and tie bars to form a grating section- A grating severing apparatus trims the ends of the grating preform.

31 Claims, 6 Drawing Sheets

APPARATUS FOR ASSEMBLING FIBERGLASS GRATING FROM PULTRUDED FIBERGLASS GRATING BARS

FIELD OF THE INVENTION

This invention relates to the manufacture of fiberglass reinforced molded resin grating and more particularly to a machine or apparatus for automatically interlocking overlying pultruded fiberglass tie bars to underlying, laterally spaced pultruded fiberglass bearing bars while forming inverted U-shaped notches at longitudinally spaced positions in the top edges of an array of laterally spaced, parallel upstanding bearing bars for snap fitting of inverted U-shaped tie bars to the bearing bars at said notches.

BACKGROUND OF THE INVENTION

The Applicant has developed over the years, weaving machines for alternately laying catalyzed resin wetted fiberglass strands within respective right angle sets of uniformly spaced, open-ended intersecting slots within the upper face of a weaving form by driving reciprocating carriages mounted on rails via rotating wheels across the top of the form bearing said slots. Such machines are represented by Applicant's U.S. Pat. Nos. 3,772,126 issued Nov. 13, 1973 and 5,074,950 issued Dec. 24, 1991. In the machine of U.S. Pat. No. 5,074,950, a horizontal base plate supports hydraulic cylinders whose projectable and retractable piston rods suspend a running bar having horizontal apertures through which the fiberglass strands pass. After passage across the form, the running bar is dropped to force the wetted strands into aligned slots. Detents engage the strands at each side of the open slots. The carriages reciprocate across the form and resin tanks bearing resin, wet the fiberglass strands prior to weaving with the strands wrapped about the periphery of three laterally adjacent spaced, spaced parallel tension bars within the tank. Subsequently, the form is inverted, the wet fiberglass strands are gravity dropped into intersecting slots of a lower mold and, the resin impregnated strands are compression molded into a formed open grating of generally rectangular, elongated form. While such apparatus provides highly dense and very strong fiberglass grating, the time and expense in manufacturing such grating significantly increases the cost thereof.

In recent years, the Applicant has formed such fiberglass reinforced molded grating of first and second sets of mutually parallel, interlocking fiberglass reinforced molding resin bars with such bars extending transversely to one another and intersecting at right angles. One set is formed of bearing bars of rectangular cross section positioned in vertically upright position, laterally spaced from each other. The upper edge of the bearing bars is provided with inverted, U-shaped notches or grooves at longitudinally spaced positions. The notches include oppositely directed, downwardly and outwardly oblique slots terminating at their upper ends, adjacent the upper edge of the bearing bars, in upwardly and outwardly diverging oblique cam surfaces. A second set of tie bars or cross bars of inverted U-shaped cross section, each include a horizontal base portion and a pair of downwardly and outwardly diverging legs of a thickness generally equal to the width of the diverging slots within the upper edges of the bearing bars, are respectively received in the slots. The legs of the cross bars at longitudinally spaced positions are provided with rectangular locking notches extending from the free ends of the legs upwardly of a width generally equal to the thickness of the bearing bars and have a height which is less than the vertical height of the tie bars.

To assemble the grating, the tie bars are forced downwardly at the locking notches into the inverted U-shaped notches formed within the upper edge of the bearing bars. Cam surfaces deflect the oblique legs of the cross bars to momentarily resiliently deform the legs to cause the portions of the legs at the locking notches to snap into the oblique slots of the inverted U-shaped notches within the bearing bars. The first and second sets of bars are therefore mechanically interlocked and are maintained in such position due to the resiliency of the legs of the inverted U-shaped cross bars. Such fiberglass grating is disclosed in Applicant's U.S. Pat. No. 4,760,680 issued Aug. 2, 1988.

While such fiberglass grating formed of interlocked pultruded fiberglass grating bars, is of reduced cost compared to that of the compression molded fiberglass grating of U.S. Pat. Nos. 3,772,126 and 5,074,950, the manual assembly of the tie bars to the underlying bearing bars and the notching of respective bars to achieve that action, requires significant manual labor and is time consuming.

It is therefore a primary object of this invention to provide an improved apparatus for automatically or semi-automatically forming a fiberglass grating of interlocked pultruded fiberglass grating bars, in which a set of underlying bearing bars are arranged for movement longitudinally over a table or other horizontal conveyor, which array of bearing bars are incremented in precise, equal steps to permit between steps, notching of the inverted U-shaped notches within the upper edges of the vertically upright rectangular cross sectional bearing bars, wherein, subsequent to the notching of a series of aligned notches within all of the bars of a respective set, adhesive is applied to the faces of the notches facing a right angle positioned cross bar, forcibly camming a tie bar into notch engagement with the set of bearing bars and the partially formed grating incremented, advancing the set of bearing bars and partially formed grating structure, from a notching station to the tie bar die press coupling station to effect interlocked engagement between an overlying tie bar and the series of bearing bars of the first set into the inverted U-shaped adhesive applied notches within the upper edge of those bearing bars.

It is a further object to provide such apparatus which permits acceptance and positioning of a plurality of bearing bars for a given set of selective thickness and height while maintaining the bars in precise laterally spaced alignment, wherein the set of bearing bars are advanced incrementally over precise distances which may be varied depending upon the desired spacing between the right angle, intersecting tie bars, which couple the bearing bars together, and wherein the bearing bars are held firmly in momentary fixed position during the notching, liquid adhesive application, and tie bar intercoupling stages of the grating manufacture.

With the foregoing objects and features and such other objects and features which may become apparent from the specification, the invention will be understood from the following description taken in conjunction with the accompanying drawings in which like numerals designate like parts.

DESCRIPTION OF THE PREFERRED EMBODIMENTS

Figure 1:
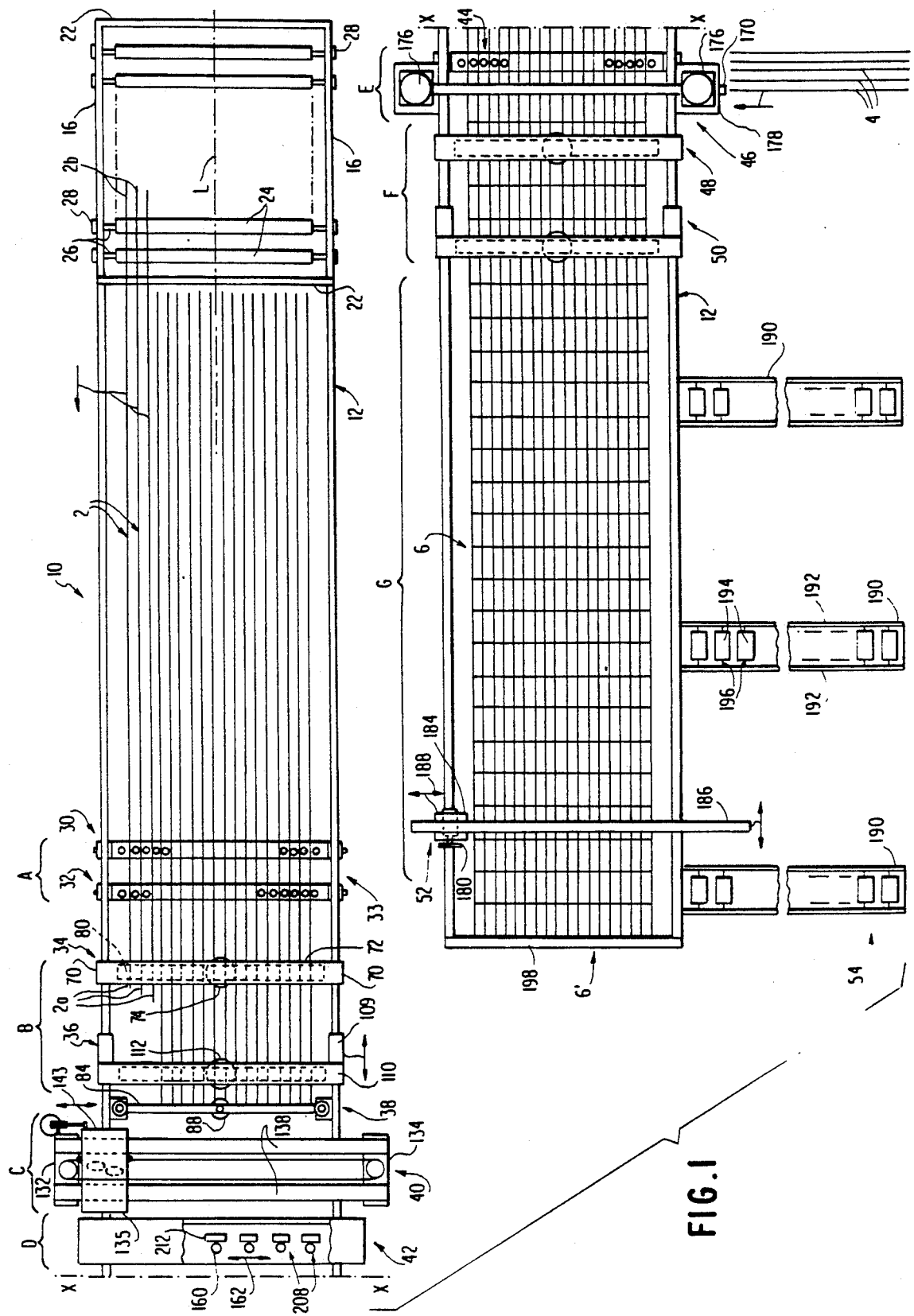
FIG. 1 is a schematic top plan view of an apparatus for automatic or semi-automatic interlocking of pultruded fiberglass grating bars and for forming defined length fiberglass grating therefrom, forming a preferred embodiment of the present invention.
Figure 2:
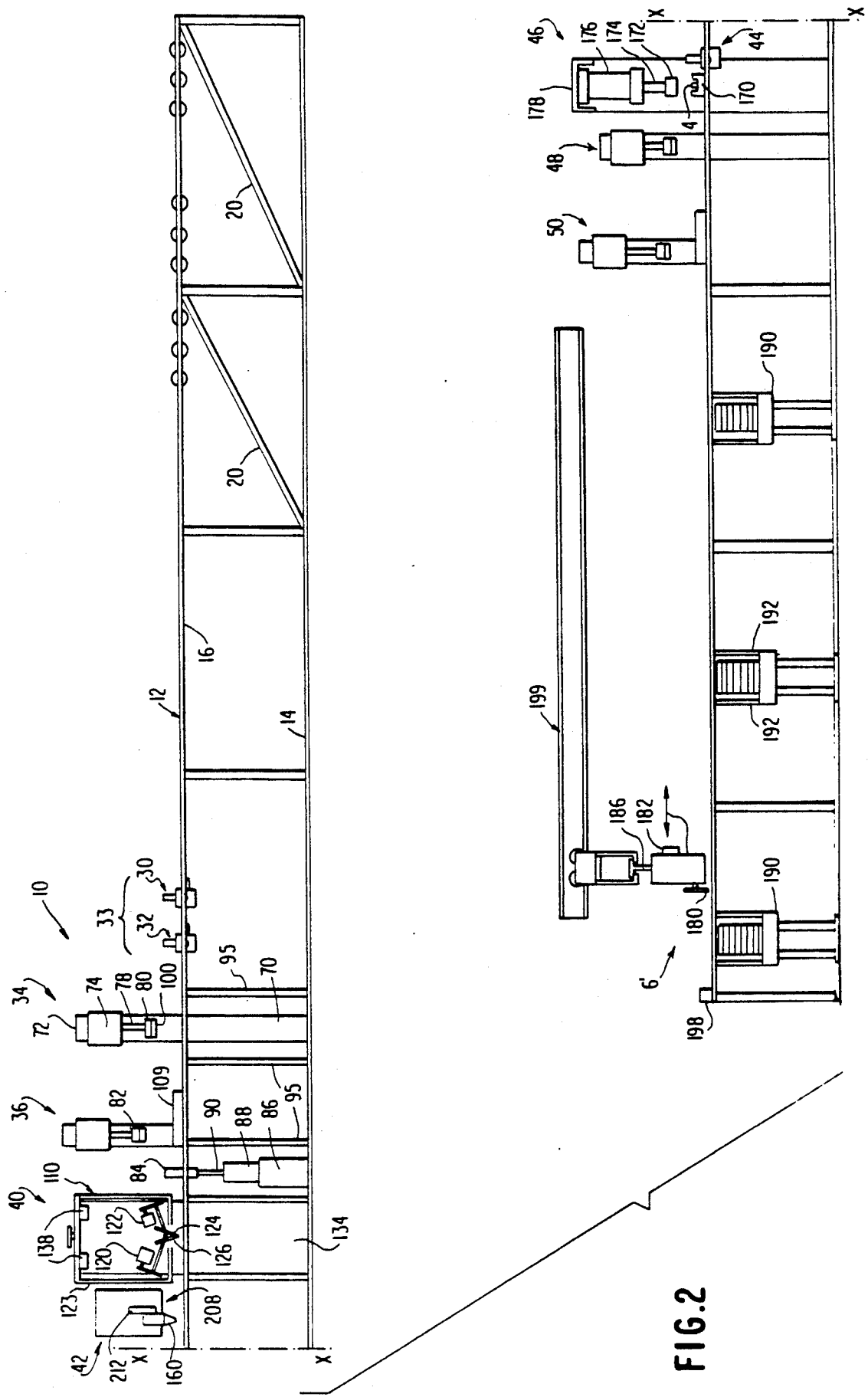
FIG. 2 is a schematic, front elevational view of the apparatus of FIG. 1.

Turning first to FIGS. 1 and 2, there is illustrated schematically an apparatus for automatically or semi-automatically assembling a fiberglass reinforced grating from pultruded bars, similar to that shown in FIG. 1 of U.S. Pat. No. 5,074,950 having a determinant size, taking a regular plan form and consisting of one set of transversely spaced parallel pultruded fiberglass reinforced resin molded grating bearing bars 2 coupled by interlocking, right angle, cross bars or tie bars 4 with the assembly process being similar to that of U.S. Pat. No. 4,760,680 and in accordance with FIGS. 1 and 2 thereof.

In this case, the bearing bars 2, FIG. 1 which may be up to 20 feet in length in the illustrated embodiment, are interlocked to cross bars or tie bars 4 which are fed manually or automatically by machine into a position underlying the hydraulic tie bar press indicated generally at 46, FIGS. 1 and 2. The bearing bars are supported in an array on the top of a table 12 which forms a principal component of the apparatus 10. The table 12 is essentially an elongated, open metal frame structure as evidenced in FIGS. 1 and 2, extending the full length of the apparatus 10.

The open frame table 12 is formed of lower and upper horizontal beams 14,16, connected by vertical risers or posts 18. In turn, the opposite sides of the open frame table 12 have the lower and upper horizontal beams 14,16, coupled together by longitudinally spaced cross beams 22 extending therebetween. Appropriate diagonal reinforcing beams 20 may be employed to provide rigidity to the rectilinear open frame structure. Extending across the open top of the table 12, from one upper horizontal beam 16 to the other at periodic longitudinally spaced positions are a plurality of hollow metal rollers or tubes 24 mounted for rotation about their ends by axles 26 which are supported within bearings or journals 28 fixedly mounted or integrated into the horizontal beams 16. This permits a worker to simply lay the bearing bars 2 of generally rectangular cross sectional configuration and having a thickness which is smaller than the vertical height of the bars, projecting vertically upright, on the peripheries of the rollers 24 supporting those members. As such, the rollers or tubes 24 constitute a conveyor upon which the bearing bars may move as an array in unison and as will be seen hereinafter in a stepping sequence incremented by a desired distance which may be 6 inches, more or less, and equal to the desired spacing between adjacent cross bars or tie bars 4 which are interlockably snap fitted into the upper edges of the bearing bars 2 in the manner of Applicant's U.S. Pat. No. 4,760,680.

The apparatus 10 of the present invention, further comprises as principal aspects of that apparatus, from right to left, FIGS. 1 and 2, first and second bearing bar spacing and alignment mechanisms or devices 30,32, defining a loading rack 33; a first hold press 34; a first car press 36; a bearing bar leading edge alignment bar 38; a bearing bar grooving unit 40; a glue applicating unit 42; a third bearing bar spacing and alignment apparatus 44; a hydraulic tie bar press 46; a second hold press 48; a second car press 50; and a completed grating severing apparatus 52.

Preferably, the apparatus 10 further includes an unloading conveyor indicated generally at 54 to the left, FIGS. 1 and 2 to receive a completed grating panel indicated generally at 6, which is moved then transversely to the longitudinal axis of the table 12 off the table 12 to permit, a succeeding unsevered grating panel, to continue to move from right to left, incrementally driven via the synchronized operation of the first and second hold and car press assemblies 34,48 and 36,50 respectively and upon release thereby, manually by a machine operator.

Prior to describing the grating assembly machine or apparatus 10 in detail, it should be appreciated that such a grating assembly machine is designed to accept bearing bars 2 in various lengths ranging from 10 feet to 20 feet and having vertical heights of 1 inch to 3 inches. In that respect, particularly the apparatus 30 and 32 constituting loading rack 33, located to the far right, FIG. 1 acts in conjunction with the rollers or tubes 24 to receive the individual bearing bars 2, by manual loading of an operator standing in front of the table 12, FIG. 1; starting first at the lateral center L of the table 12. For loading rack 33, the center bearing bar slot may be marked with two screws located on the top of respective laterally adjacent first separators 56 at the lateral center of the table. The separators 56 are constituted by short length dowels or pins which project perpendicular, outwardly of one flat face 58 of a hollow square metal tube 60. The pins may be on two inch centers in the illustrated embodiment. Tube 60 is mounted for rotation about its axis at 62, on journals 64 fixed to laterally opposed upper beams 16 of the open frame table 12. In the illustrated embodiment, the square hollow tubing 60, has a second set of pins or dowels 66, projecting outwardly transversely at longitudinally spaced positions along a second flat face 59 from the right angle flat face 58 from which pins or dowels 56 project. In the illustrated embodiment, the spacing between pins 66, is 1 3/16 inches; that between the pins 56 is 1 inch, thus the pins 56,66 accommodate different thickness bearing bars 2. It should be apparent, that the hollow square tube 60 may be locked in either of two positions at 90° rotated one from the other. A locking or latching means is provided for maintaining the bar 60 in either of its two extreme positions presenting one set of pins 56 or the other at 66 in a vertically upright position adaptable to space and align bearing bars 2 when acting in conjunction with the second spacing and aligning device 32, a third such device at 44, or others, maintain the bearing bars 2 in parallel alignment and at equal laterally spaced positions transversely across the full array of such bars prior to and after intercoupling of the same via the tie bars or cross bars 4 as will be seen hereinafter.

It is very important that the machine 10 be loaded with the bearing bars 2 equally on each side of the longitudinal center line L, FIG. 1. With the bearing bars 2 located off center, damage to the machine may result if the bearing bars 2 are loaded improperly. It is only after the appropriate quantity of bearing bars 2 are loaded to provide a completed grating of appropriate width or length that the operator can begin the grating assembly operation. Downstream of the bearing bar spacing and alignment devices 30,32 defining loading rack 33, are located a first, hold press 34 and the first, car press 36, respectively. The hold press 34 is a vertically upright, transversely extending press comprised of vertical risers 70, supporting therebetween an overlying cross beam 72 which mounts, a hydraulic cylinder 74 which, has depending downwardly therefrom, an extendable and retractable piston rod 78. Rod 78 is fixed to an underlying, transversely extending, hold down bar 80 which is of a length so as to extend completely across the table 12. The lower surface of bar 80 is covered with a compressible mat 100 for pressing engagement against the top surfaces of the vertically upright bearing bars 2 at the leading ends 2a thereof which project beyond the first and second bearing bar spacing and alignment devices 30,32. The hydraulic cylinder 74 acts to maintain a given force on the top surfaces of the aligned and laterally spaced bearing bars 2, the bar 2 being pressed against an underlying plate so as to normally prevent their movement both laterally and longitudinally during depression of the hold down bar 80.

The first hold press 34 acts in conjunction with the first car press 36 with the car press 36 remaining in a raised or opened position with the hold down bar 82 thereof raised above the top edges of the vertically upright bearing bars 2. The car press 36, similar to hold press 34 has a hold down bar 82 which is hydraulically driven from raised to lowered position and vice versa against the tops of the set of bearing bars 2 while additionally shifted longitudinally towards and away from the hold press 34 on blocks 109 to frictionally increment the set of bearing bars 2. During loading of the bearing bars 2 in a horizontally parallel array with the leading ends 2a thereof passing through respective gaps between the sets of pins 56 of the first and second spacing and alignment devices 30, 32 the first hold down press and the first car press have the respective hold down bars 80, 82 in vertically raised position well above the top surfaces of the grating bearing bars 2. At this time, the leading ends 2a of the grating bearing bars are manually slid forwardly to a point where, those ends 2a abut the vertical upright face of a horizontal stop bar 84, with the upper end of that bar 84, FIGS. 1, 2, being raised vertically above the height of the vertically upright grating bearing bars 2.

A small bench 86, FIG. 2, is integrated to the open framework 12 and supports an upright hydraulic cylinder 88, whose piston rod 90, projects upwardly and outwardly of the hydraulic cylinder 88 and is fixedly coupled to the bottom of the stop bar 84. By energizing the hydraulic cylinder 88, the upper end of the stop bar 84 is selectively raised above the top of table 12, FIG. 2, so as to prevent further advancement of the individual grating bearing bars 2 as they are inserted into the gaps between alignment pins (such as pins 56) of the loading rack 33.

The stop bar 84 is located approximately 3 inches upstream of the bearing bar grooving unit 40. Bearing bar grooving unit 40 as schematically illustrated in FIGS. 1 and 2 takes the form of a rectangular closed enclosure (not shown) which extends laterally well beyond the outside of the side bars 16 of table 12 with the enclosure extending below the table housing. Internally of the enclosure, supported vertically adjustable posts or risers indicated in rectangular block form outlined at 132,134 are a pair of transversely extending cross bars 138 defining laterally opposed transversely extending rails upon which is mounted a grooving head 110 for transverse movement from a retracted position in front of the operator, FIG. 1, to an advance position to the opposite side of table 12. The head 110 mounts a pair of rotary saw drive motors 120, 122 whose output shafts are coupled to respective rotary disc saws 124, 126, the motors and saws being offset fore and aft (transversely) and with the rotary saw blades 124, 126 oppositely obliquely positioned such that their lower ends overlap slightly in the cutting zone of the underlying array of bearing bars 2 as will be described in detail hereinafter. The grooving head 110 is positively driven through a sprocket and chain drive system in the advance direction and retraction directions alternately.

Figure 10:
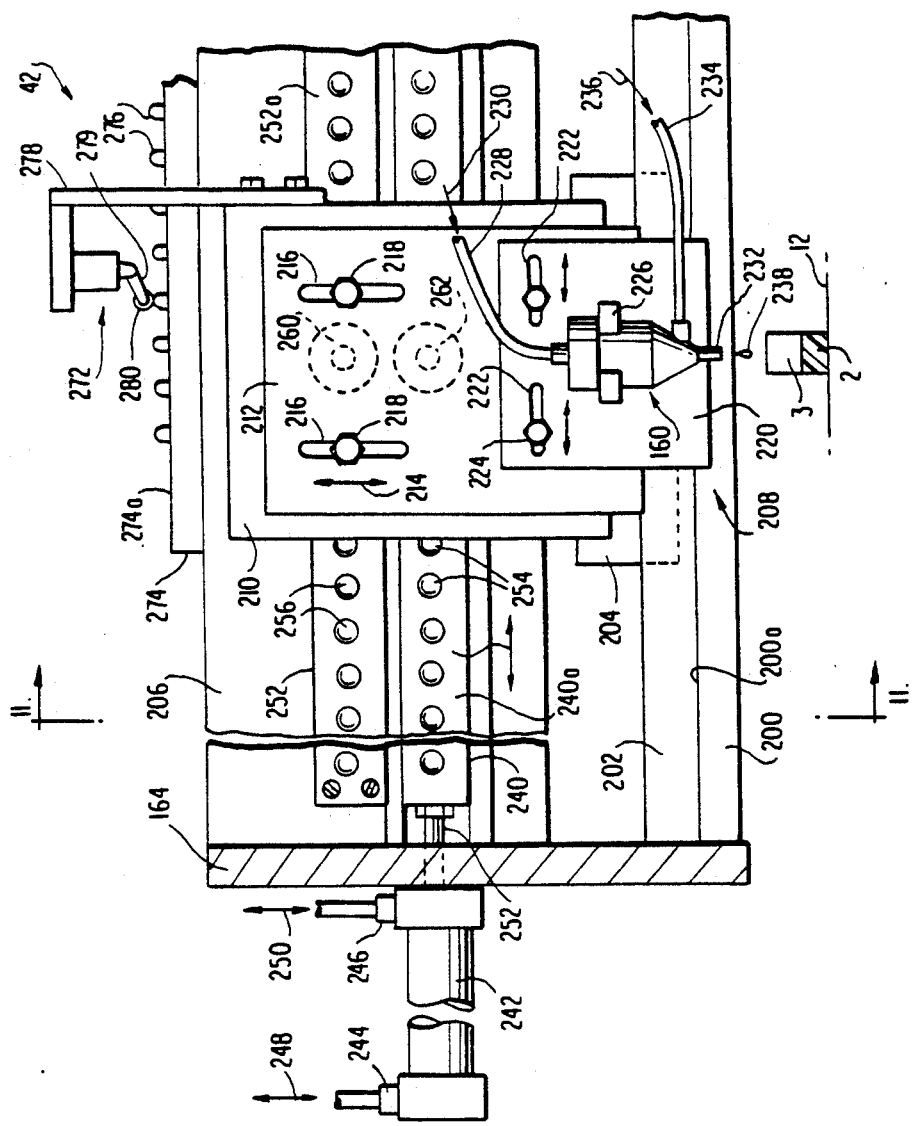
FIG. 10 is an enlarged schematic rear elevational view of a glue applicating unit of FIGS. 1 and 2.

Downstream of the bearing bar grooving unit 40 is the glue applicating unit 42. A plurality of glue dispensing heads or nozzle heads 208 are mounted for movement incrementally across the top of table 12 each carry a liquid adhesive dispensing nozzle 160 which is selectively alignable with the center line of the previously notched leading ends 2a of the bearing bars 2, with the glue heads being stepped bidirectionally as indicated by double-headed arrows 162, FIG. 1. Such is effected by a suitable hydraulic cylinder 242, FIG. 10, functioning as a linear motor. Such action is effected via a common control panel for the apparatus 10 and a control system typically associated with such hydraulic cylinder linear motor. The hydraulic cylinder itself, as per FIG. 10, is mounted to one of the vertically upright end walls 164 of the open frame of the glue applicating unit 42. The cylinder is mounted horizontally with the a projecting end of the piston of the cylinder fixed to a vertical side face of a movable rear plate or to a lateral end of the slide supporting that plate, mounted for reciprocation within a U-shaped underlying rail.

Figure 11:
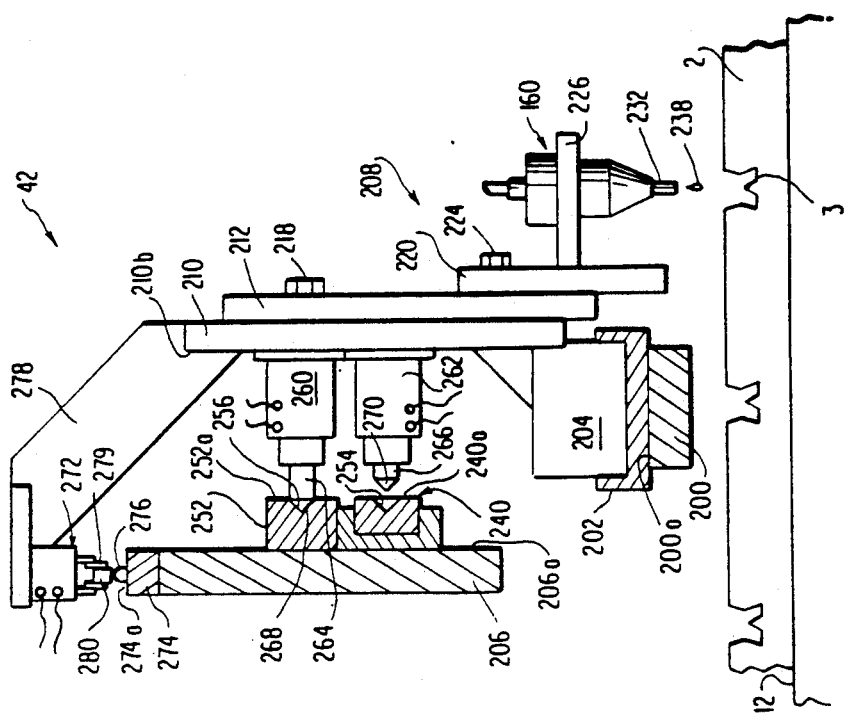
FIG. 11 is a sectional view of the glue applicating unit, taken about line 11—11 of FIG. 10.

.The nozzle heads 208 carry liquid adhesive dispensing nozzles 160 which assemblies meter one or more drops of liquid adhesive of sufficient volume onto each notch 3, FIGS. 10, 11, within the upper edge of the bearing bars 2 to ensure adhesive locking of the tie bar or cross bar to the upper edge of vertically upright bearing bars at the notch locations. The drop of liquid adhesive is applied to the center of the notches and flowing down into the respective oblique slots formed by the crossed saw blades 124,126. The step feed of the notched bearing bars 2 is terminated during step movement of the nozzle heads 208 transversely from one side of the glue applicating unit 42 towards the other. By increasing the number of nozzle heads 208, the time required to apply a drop of liquid adhesive at each precut notch of all of the bearing bars 2 of each array being processed to form the finished grating, can be materially decreased. The particular setup and the basics of the control system for effecting the incrementing of the glue applicating metering pump and nozzle assemblies and the initiation and cutoff of the glue flow will be described in detail hereinafter.

Preferably, the apparatus 10 includes a third bearing bar spacing and alignment mechanism 44 similar to that at 30 and 32 interposed between the glue applicating unit 42 and the hydraulic tie bar press 46.

In the illustrated embodiment, the hydraulic tie bar press 46 is of 30-ton capacity since considerable force must be exerted on each tie bar or cross bar 4 once positioned across and spanning all of the bearing bars 2, aligned with a series of notches 3 formed by the bearing bar grooving unit 40, and in alignment with those notches. Such positioning of the tie bar or cross bar may be manually effected onto the array of bearing bars by the machine operator. Alternatively, such tie bars may be sequentially fed into proper position, in this case, from the front of the machine, FIG. 1, at the hydraulic tie bar press 46 or just upstream thereof constituting one station of the multi-station apparatus 10. It is envisioned, o that the tie bars 4 may be manually or machine fed serially, in line, through a support or guide such as upwardly open channel member 170 of a predisposed length. Each tie bar or cross bar 4 should have precut rectangular slots within the legs thereof, as at 30, FIG. 1, in U.S. Pat. No. 4,760,680. The vertical position of the tie bar 4 being fed is just above the tops of the vertically upright bearing bars 2, so as to lie beneath the raised press bar 172 which spans across the transverse width of the table 12, downstream of the spacing and alignment pins of the bearing bar spacing and alignment mechanism 44 which assists in maintaining the array of parallel bearing bars 2 parallel and uniformly laterally spaced.

The tie bar press is constructed like each hold press 34, but with two hydraulic cylinders shifting its press bar in unison.

The press bar 172 is supported by the projecting piston rod 174 of a pair of hydraulic cylinders 176 which in turn are fixed to a vertically upright inverted U-shaped frame structure 178 of the hydraulic tie bar press as illustrated schematically in FIGS. 1 and 2. The hydraulic cylinders 176 are vertically positioned such that the projection of the piston rods 174 cause a very high compressive force to be applied to the top of the inverted U-shaped cross sectional tie bars to effect a mechanical, interlock coupling between the tie bars at the location of the notches within the oblique outwardly flared legs thereof and the upwardly directed inverted U-shaped notches within the tops of the upright bearing bars 2, all in accordance with the interlock detailed within U.S. Pat. No. 4,760,680. As may be appreciated, depending upon the length of the bearing bars 2 passing through the apparatus of FIGS. 1 and 2 from right to left in a direction of the center line C, the first car press 34 and first hold press 36 act alternatively to fix the positions of the tie bars after incremental forward feed at exact distances in the illustrated embodiments of 6 inches. It is necessary to continue that incremental movement in a stepwise fashion beyond the last active station of the machine or apparatus 10 (other than severance of the trailing ends of the grating panel into desired longitudinal lengths of finished grating 6' having uniformly opposite ends), as effected by the completed grating severing apparatus 52. Such continued incremental stepping of the panel 6 is accomplished by the second hold press 48 and second car press 50 which act jointly with and the same manner as the first hold press 34 and the first car press 36. These units are duplicated of each other and like elements bear like numeral designations. The (second) hold press 48 is immediately downstream of the hydraulic tie bar press 46, and the (second) car press 50 is spaced downstream therefrom, similar to the separation between the first car press 36 and the first hold press 34 at the system opposite upstream side of the apparatus 10. Thus, the car press 50 acts to incrementally move the leading ends 2a of the bearing bars 2 of a given panel 6 after the trailing ends 2b of those bearing bars pass beyond the first hold press 34 and the first car press 36 during stepping of the bearing bars 2 and multiple station sequence machine operation.

The table 12 extends downstream, to the left of FIG. 1, beyond the second car press 50 and the rollers 24 may be spaced further apart, at this end of machine 50 since the grating panel or preform 6, may be a length of up to 20 feet in the illustrated embodiment prior to severance transversely of the trailing ends 2b to form a completed grating panel. The trailing ends 2b are severed generally at 6' by operation of the rotary driven circular saw blade 180 driven by a motor 182 mounted on a carriage 184 forming a cut-off head 185 which is driven transversely across the table 12 along a overlying transversely extending saw support bar or beam 186 which straddles table 12 and from which the saw blade 180 projects by way of carriage 184 which is reciprocally driven transversely back and forth as indicated by arrow 188. The grating panel 6, at the point has its leading end abutting a roller conveyor stop bar 198.

Additionally, in the schematic representation in FIGS. 1 and 2, the severed completed grating panel may be manually discharged from the top of table 12 onto an unloading conveyor system 54, defined by a series of vertically upright supports 190 rising short of the full height of table 12, having laterally opposed side walls 192 which mount, horizontally, therebetween, a plurality of short length rollers or tubes 194 by way of axles 196. The rollers have peripheries which project above the frame or support 190. The unloading conveyor system in the illustrated forth requires manual (or automated) movement of the completed grating, after bearing bar trailing end severance by apparatus 52, onto the unloading conveyor system assembly units 190 from table 12, in this case, in a direction toward the front of the apparatus 10, FIG. 1. The units 190 may be loaded with a stack of such completed grating panels 6', in sequence upon severance of each grating panel preform 6 by the severing apparatus 52. In that respect, preferably a means 199 is provided for moving the beam 186 parallel to the longitudinal axis L of the table 12 to shift the trailing end severance line of the bearing bars 2 of the panel preform 6 depending on the length of grating panels being assembled.

From the above description directed to the basic components of the apparatus 10, it is apparent that along the length of the table 12, there exists a series of stations which act on the bearing bars 2 as an array and on the tie bars 4 being fed into the path of those bearing bars.

The initial station A is a bearing bar loading and aligning station where the loading rack 33 acts to facilitate the manual placement of the bearing bars 2 onto the table conveying system comprised of rollers or tubes 24 such that the various bearing bars 2 extend parallel to each other and positioned beneath the upstream bearing bar feed and hold station B which facilitate their step-by-step incremental movement in the direction of opposite end of table 12. The upstream bearing bar feed and hold station B functions to feed the array of bearing bars 2 incremented the appropriate six inch distance in the illustrated embodiment for notching the top edges of the vertically upright bearing bars 2 at bearing bar grooving station C. After notching, the array of bearing bars 2 are initially incremented by operation of the upstream bearing bar feed and hold station B to place the notched bars underneath the glue applicating unit 42 at bearing bar gluing station D.

Downstream of the bearing bar gluing station D, lies hydraulic tie bar press 46 which forms tie bar pressing station E. Depression of press bar 172, drives an overlying tie bar 4 into the aligned notches 3 within the top edges of the array of bearing bars 2.

As incremental feeding of the array of bearing bars 2 ceases at station B, when the trailing ends 2b of the bearing bars pass through the upstream bearing bar feed and hold station B, the downstream bearing bar feed and hold station F comprised of the second car press 50 and the second hold press 48 continues to incrementally drive the completed grating preform 6 in an identical step movement towards of the downstream end of the table 12 to the left, FIG. 1. The grating panel preform 6 moves next to the completed grating preform severing station G. After severing of the trailing ends 2b of the bearing bars, the severed, completed grating panel is mechanically or manually moved off the top of table 12 onto the unloading conveyor system 54.

Figure 3:
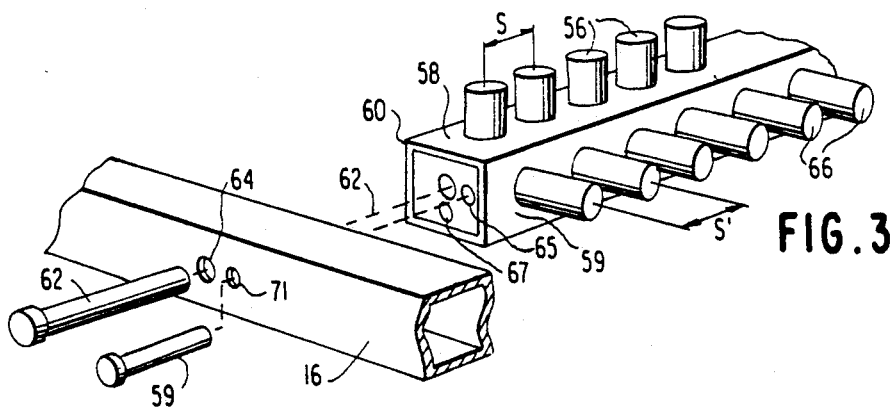
FIG. 3 is an enlarged, exploded, perspective view of one end of a bearing bar spacing and alignment mechanism forming a portion of the apparatus of FIGS. 1 and 2.

The description of the apparatus at the various stations A through G will now be described in greater detail. Referring to FIG. 3, which is a perspective view of a portion of the loading rack 33 and particularly, the upstream bearing bar spacing and alignment mechanism 30, each mechanism 30,32 is identical and like numerals apply to like elements. Both are formed principally of a square cross section hollow tube or bar 60, having four right angle exterior surfaces, two at 58,59. A first set of spacing and alignment pins 56 project outwardly at right angles to one face 58, to form spaces or slots S' between closely adjacent pins 56 which may be, for instance, 1 inch. The pins 56 form a vertically extending array over the complete length of the bar or tube 60 which spans between the laterally opposed beam 16 of table 12. On the horizontal adjacent flat face 59 which extends upwardly above the top of table 12, there is a second array of longitudinally spaced bearing bar spacing and alignment pins 66 which define spaces S', which may be of 13/16". In order to mount the bar or tube 60 for rotation about its horizontal axis 61, both side beams 16 have mounted thereto, journals 64 which rotatably receive axles 62 projecting outwardly from the opposite ends of the bar or tube 60. In order to lock the bar 56, at 90° rotated positions, and to present either the first array of pins 56 in vertically upright position or, a second set of pins 66, the schematic representation in view of FIG. 3 illustrates a simplified locking arrangement. A first hole 65 is drilled from the outside into each end of the bar or tube 56 and a second hole 67 drilled into those ends at 90° to the hole 65 at the same radius as hole 65. A hole 71 is drilled into each beam 16, selectively, alignable with either a hole 65 or a hole 67 of the bar or tube 56. Lock pins 59, of a suitable length so as to pass through aligned holes 71, 65 or 71, 67 are inserted into the holes 71 drilled through each side beam 16 of the tabletop and penetrated into a given hole such as 65 within each end of bar 56 to lock the pins 86,66 in vertically upright position.

The locking mechanism includes lock pins and appropriate holes within the beams 16 to the opposite side of the table and like holes 65,67 within the ends 56a of the bar or tube 56 on both sides. With lock pins 59 removed from the tabletop side beams 16, the bar 56 is free to rotate. When rotated through the position shown in FIG. 3, lock pins 59 having a diameter slightly less than that of hole 71, and that of holes 65,67 is positioned within the hole 71 of the beam 16 to each side, and the leading end thereof, inserted into the aligned hole 67 such that the bar 56 is prevented from rotation about its axis 61. The setup remains as illustrated in FIG. 3 until, it is desired to form a grating panel of bearing bars 2 having a thickness sized to the spacing S' between pins 66. At that time, the lock pins 59 are removed, the bar 56 rotated counterclockwise 90° about its axis 62 so that the pins 66 move into vertical upright position while the pins 66 move into a horizontal position facing the downstream to the left, FIGS. 1 and 3. The leading ends of the lock pins 59 are then projected through holes 71 within beams 16, with those leading ends received within the holes 67, now aligned therewith and the bar 60 is locked into its 90° rotated position.

Figure 4:
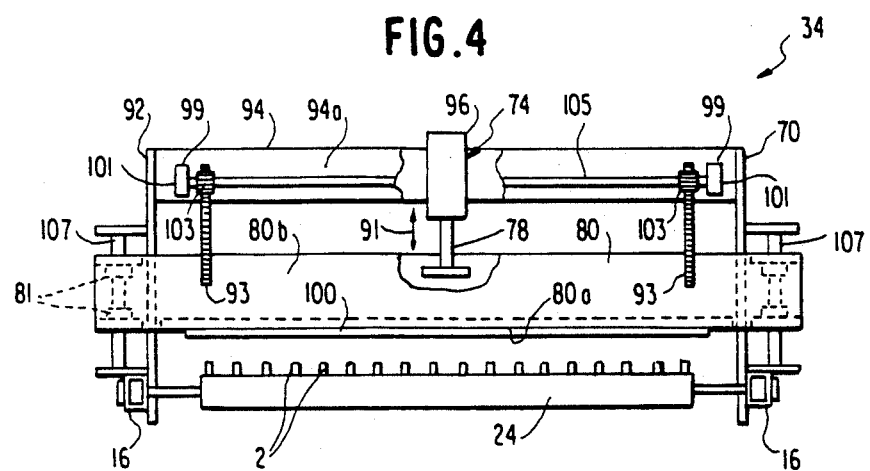
FIG. 4 is an enlarged, schematic front elevational view of one of the hold presses of the apparatus of FIGS. 1 and 2.

Referring next to FIG. 4, this Figure is a schematic showing of the pertinent details of the first hold press 34 and the first car press 36 which constitute longitudinally spaced, side-by-side units which cooperate with second hold press 48 and second car press 50 to step feed the array of bearing bars 2 incrementally. The presses maintain the bars in a stationary position on the conveyor rollers or tubes 24 while the structures at the active processing stations of the apparatus 10 operate to notch the tops of the bearing bars 2, apply a drop or drops of liquid glue through the notches and to compress the overlying tie bar aligned with those notches into interlocking coupling with the bearing bars 2 at spaced longitudinal positions along the array of bearing bars to create a grating panel 6. The downstream bearing bar feed and hold station F is comprised of a duplicate, second hold press 48 and a duplicate, second car press 50 to that shown in FIG. 4.

Further, the mechanisms of the hold press and car press at both stations B and F, are essentially the same, each car press is simply mounted for movement parallel to the center line L of table 12 towards and away from the hold press which remains stationary and at a fixed point on the right to left extending table.

In FIG. 4, immediately upstream of the first hold press 34, there is provided a roller or tube 24 which is mounted between the laterally spaced side bars 16 of table 12 for rotation horizontally about its axis, by a journal 28 and just upstream of at least one spacing and alignment mechanism such as that at 32, FIG. 1.

The hold press 34 (as well as that at 48) includes on vertically upright side walls 70 which extend upwardly from the interior faces of the laterally opposed side beams 16 of the table 12 a fixedly mounted cross beam 72 which extends the full width of the table. The cross beam 72 may be a hollow structure formed of sheetmetal, within which is mounted, at the center of the cross beam, a vertically upright hydraulic cylinder 74. Projecting downwardly from that cylinder is a piston rod 78 which is fixed to an underlying transversely extending hold bar 80. The hold bar is rectangular in cross section, and its lower face 80a is covered by the thin resilient pad 100. By extension and retraction of the piston rod 98 by the supply and release of a hydraulic liquid behind oppositely directed faces of a piston (not shown) internally of the cylinder 74, the hold bar 80 is raised and lowered as indicated by arrow 91, FIG. 4.

The open frame table 12 may be reinforced by various risers as at 95, to permit the table 12 to bear the weight of the first hold press 34, and the first car press 36. In order to synchronize the movement of the hold bar 80 as it is raised and lowered with respect to the top of the table 12, and particularly the array of bearing bars 2 supported thereby which pass under the hold bar 80, fixedly mounted to a vertical face 80b are two racks 93 by bolts or screws (not shown), FIG. 4. Free ends of the racks 93 extend upwardly and in sliding contact with a vertical face 94a of the cross beam vertical wall 94. A pair of brackets 99 are mounted to face 94a of the cross beam wall 94 to the side of the racks 93. The brackets carry journal bearings 101, which support a horizontally extending rod or shaft 105 which extends from one journal bearing 101 to the opposite journal bearing. Pinion gears 103 are carried by the shaft or rod 105, and have radial teeth thereof meshing with the teeth of the racks 93 which face outwardly of the racks. As a result, the hold bar 80 is maintained horizontal during the raising and lowering of the same. Trunnions 81 are carried by the hold bar 80 at opposite ends, and which slidably receive fixed vertical rods 107 which extend upwardly, from the table side beams 16 at opposite sides of the hold press 34 and which are fixed to hold press subwalls 70. The rods 107 function as guides to maintain the alignment of the hold bar 80 such that the bottom face 80a of the hold bar is horizontal, as is the resilient pad 100 fixedly mounted thereto. In machine operation, the hold bar 80 is raised to a position permitting the incremental step feeding of the array of bearing bars 2. When the piston rod 98 is extended sufficiently the pad 100 is functionally pressed against the top edges of those bars to frictionally maintain the bar against an underlying plate of table 12 and stationary, under the applied force developed in the hydraulic cylinder 96 to ensure precise cutting of the notches by the bearing bar grooving unit 40 which is just downstream of the first car press 36.

To effect bearing bar incremental step movement at a distance, in the instant embodiment, of 6 inches, each car press including first car press 36 is mounted for movement longitudinally of the table by cars or blocks 109 at opposite sides of the table. Each side bar 16 of the table mounts, along the upper face 16a thereof, a rail 104 which is of rectangular cross section, which includes a V-shaped projection 104b at its center on a top edge 104a thereof of inverted V-shape with the apex thereof facing upwardly. Carriages indicated generally at 115, are formed principally of cars or blocks 109, which have an inverted V-shaped groove at 111 within the block bottom surface 104b matching the inverted V-shaped projections of rails 104. Blocks 109 therefore support the load on opposite sides of the table of major portions of each car press 36, for movement towards and away from the stationary first hold press 34 in the direction of the double-headed arrow 115A, FIG. 6. Pairs of side plates 115a of carriage 115 extend over some distance in the direction of the first hold press 34 on each side of the rails 113, and hold between those side plates a V-pulley or wheel 117 mounted for rotation about the axis of axle 119, whose ends are fixed to opposite side plates 115a. As may be appreciated, a similar assembly is provided on the opposite side of the table above the opposite side bar 16 of that table.

Figure 6:
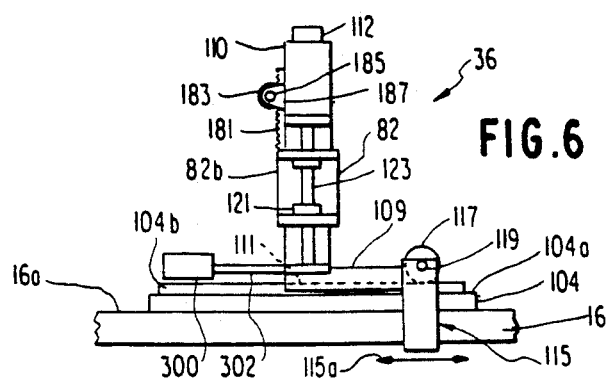
FIG. 6 is a schematic side elevational view of the car press of FIG. 5.

A drive mechanism, schematically shown as a hydraulic cylinder 300 is directly coupled via a piston rod 302 thereof to carriage 115 such as to a block 109, to effect the limited 6 inch incremental step movements of the first car press 36 cylindrically towards and away from the stationary first hold press 34. Alternatively, a motorized gear drive may be employed to drive each car press towards and away from the hold press at respective stations B,F. In some similar fashion to the first hold press 34, a cylindrical trunnion 121 is mounted to each end of the hold down bar 82, which ride on vertically upright rods 123 which pass therethrough and which are supported by a vertical side plate 108 of the car hold press 36. The two side plates 108, are connected together at the top by a horizontally extending transversely directed cross bar 110 which may be of hollow sheetmetal construction. Cross bar 110 carries internally, a vertically oriented hydraulic cylinder 112 aligned with the center line L of the table 12. Depending from the hydraulic cylinder 112 is a piston rod 114 which has a lower, projecting end thereof fixed to the hold down bar 82 of the car press 36. As shown in FIG. 6, on rear face 82b of the hold down bar 82, there is provided a pair of vertically upright racks 181 similar to those at 93 for the hold press 34 which engage toothed pinions 183 borne by a horizontally shaft 185 journaled for rotation about its axis on brackets 187 carried by cross bar 110 identical to the arrangement at 99, 105, 103 on the first hold press 34. The arrangement is such as to permit, a soft resilient pad 116 which is fixed to the bottom face 82a of the hold down bar 82 to be pressed under the developed frictional force of hydraulic cylinder 112 against the top edges of the bearing bars 2 similar to the developed force on the pad 100 of the hold down bar 80.

Figure 5:
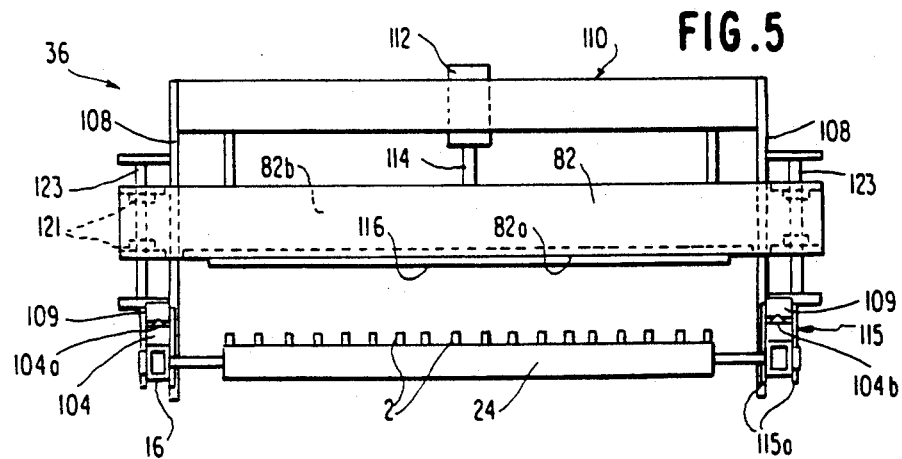
FIG. 5 is an enlarged schematic front elevational view of a car press of the apparatus of FIGS. 1 and 2.
Figure 7:
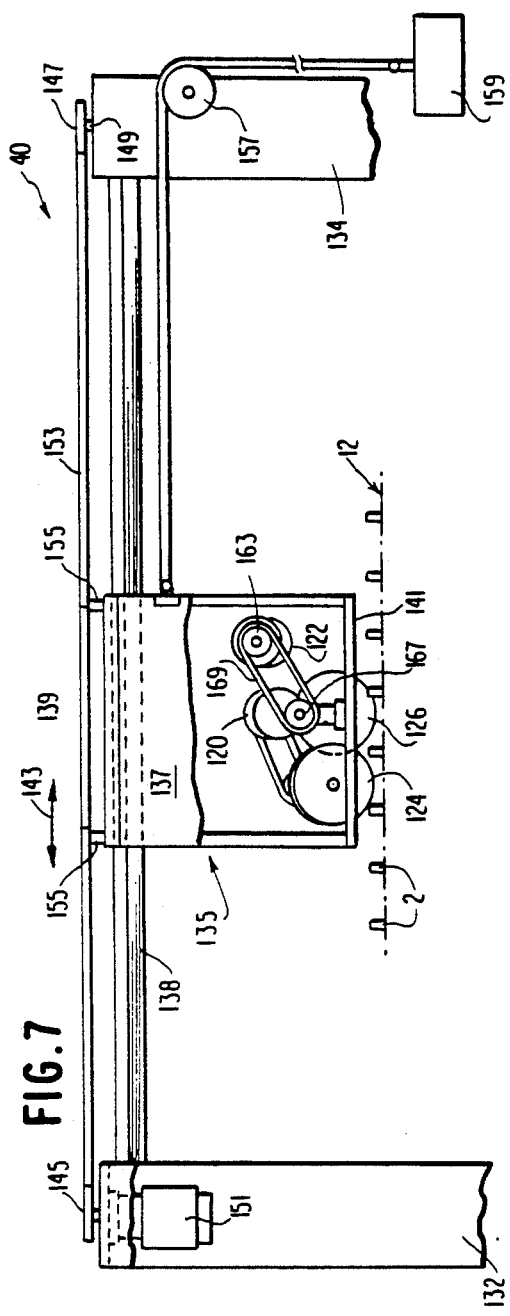
FIG. 7 is a schematic front elevational view of the bearing bar grooving unit of FIGS. 1 and 2.
Figure 8:
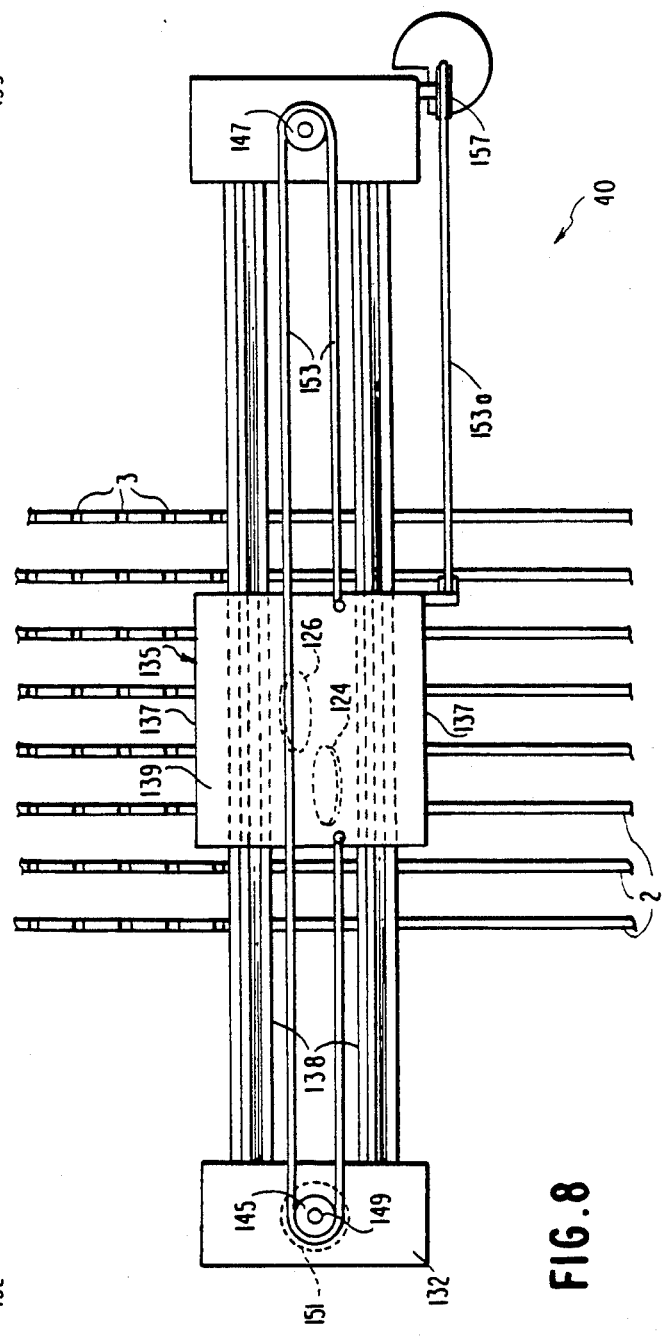
FIG. 8 is a schematic top plan view of the bearing bar grooving unit of FIG. 7.

The bearing bar grooving unit 40 at the succeeding downstream bearing bar grooving station C preferably includes a rectangular, vertically upright housing (not shown) which extends from a position below the table top 12 as per FIG. 2 to some distance well above that table top. Such may be formed of sheetmetal to enclose an interior space which is subjected to the creation of a significant amount of fiberglass and resin dust as a result of grooving of the tops of the bearing bars 2. The dust is removed by an exhaust system (not shown). Unit 40 provides the inverted U-shaped notches to the upper edge of the bearing bars 2 for reception of the lower, flared legs of the inverted U-shaped tie bars or cross bars 4. The principal component of the bearing bar grooving unit 40 is a grooving head 110 in the form of a rectangular open-ended box structure which functions as a carriage, and which is transported internally of the housing or enclosure 123 at station C, from one lateral side of the table 12 to the other. As seen more particularly in FIGS. 7, 8 and 9, in the schematic top plan view of FIG. 5, a pair of transversely extending parallel rails 138 are supported at opposite ends by vertical pillars or supports 132, 134. Suspended on the rails 138 is a rectangular open box shaped grooving head frame, indicated generally at 135, formed of opposed vertical side walls 137, a top wall 139, and a bottom wall 141. The rails may terminate on their upper faces in an inverted V-shaped projection with, the top wall 139 of the grooving head frame, having inverted V-shaped grooves matching those of the rails 136 and receiving the inverted V-shaped portions of the rails. The grooving head frame 135 is therefore suspended by the rails for bidirectional movement transversely, as indicated by the double-headed arrow 143. In the schematic representation of FIGS. 7, 8, disposed on opposite sides of the table 12 are respective sprockets 145, 147 mounted for rotation about their axis by vertical shafts or axles 149. A electric motor indicated generally at 151, may have its output shaft directly coupled or connected via a gear train to sprocket shaft 149 for driving the same bidirectionally. A chain 153 which extends between the sprockets, is suitably coupled to the open box frame of the grooving head or another element thereof such that by energizing the motor 151, the grooving head 110 is moved completely across the top of the table 12 within the enclosure. The bottom wall 141 of the grooving head box frame, is supported some distance above the top of table 12 and the table projects upwardly within the enclosure and faces the grooving head box frame 135. The grooving head box frame 135 fixedly supports, in the illustrated embodiment, a pair of electric motors 120,122, which act to rotatably drive rotary saw blades 124,126. The motors 120 and 122 and the saw blades 124 and 126 are offset from each other in the transverse direction of the tabletop. With the blades oppositely oblique, and their bottom ends crossed or slightly overlapped, they give X-notch configuration, when cutting, to the top edges of bearing bars 2 as the grooving head 110 traverses across the interior of the enclosure from one side to the other. In the schematic view, Figure 5, opposite ends of the chain 153 are fixed to the box frame grooving head. A second chain 153 is led over a further sprocket 157 and one end thereof is fixed to a vertically raisable and lowerable counterweight 159, the other end being fixed to box frame 135. As may be appreciated, with the grooving head box frame 135 moving in FIGS. 7, 8, from left to right, as also illustrated in FIG. 1, the weight 159 drops tending to maintain a uniform force during the notching of the top edges of the bearing bars in a uniform manner. With the motor 151 reversed, in driving the grooving head box frame 135, the weight moves upwardly towards the top of the enclosure. The arrangement is such that the weight 159 is vertically displaced over some distance, but not completely from the floor level of the bottom beam 14 of the table 12 to the top of the enclosure. Further, the connection to the weight 159 may be other than via a chain such as via a flexible rubber band.

Figure 9:
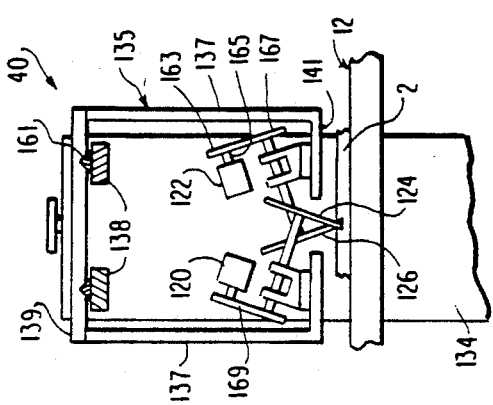
FIG. 9 is an end view of the bearing bar grooving unit of FIGS. 7 and 8.

Referring next to FIG. 9, the schematic view illustrates the details of the grooving head 110, particularly the vertical side walls 137, the bottom wall 141, the inverted V rails 138, the top wall 139, the inverted V-shaped grooves 161 within the bottom of the top wall 139 (or a horizontal bar fixed thereto). In addition, this schematic view illustrates the nature in which the two rotary saw drive motors 120,122 are positioned, the inclination of the same. A coupling pulley 163 is mounted to each motor drive output shaft 165. The circular disc saw blades 124,126 are mounted for rotation about their axis via a further V pulleys 167. A connection is effected by the use of a V belt 169 to effect a friction coupling drive between the drive motors 120,122 and their respective oblique saw blades 124,126. Of course, the belt drive of the saw blades could be changed to a chain drive and the illustrated arrangement is exemplary only of a suitable system for effecting a rotary drive of oppositely oblique overlapping peripheral edge disc saw blades 124,126 to effect the desired cut within the top edge of the various bearing bars 2 are stationarily maintained by the hold press and/or car press at stations A, B.

FIG. 9 being a schematic elevational view, looking into a lateral end of the bearing bar grooving unit illustrates the manner in which the notched, bearing bars 2 are positioned for notching to and aligned with the upstanding spacing and alignment pins 66 of the loading rack 33 and unit 44 cooperating therewith. In FIG. 9, it is apparent that the bottom wall 141 of the grooving head box frame 135, is several inches above the tops of the bearing bars 2 and slightly above the upper ends of two rows of alignment and spacing pins (not shown) to opposite sides of the notching area of the lower peripheral edge, of the overlapped saw blades 124, 126. FIG. 9 also indicates the degree of slope of the drive motors 120, 122, oppositely to each other and facing the notching zone. Additionally, the two runs of the chain 153 extending between the spaced sprockets 145, 147 illustrate the manner in which the grooving head 110 may be chain driven so as to move laterally, FIGS. 1 and 5, towards and away from the operator at the front of the machine.

FIGS. 10 and 11 are schematic views of the various elements making up the glue applying unit 42. The pair of laterally opposite vertical side walls 164 rise upwardly from the top table 12, have lower ends thereof fixed to an underlying lower support bar 200 which spans across the tabletop at some distance above the laterally spaced side bars 16 and which extends from side-to-side of the table 12. Fixedly mounted to the top surface 200a of the lower support bar is an upwardly open U-shaped elongated metal channel or track 202 slidably mounting an elongated metal slide 204, therein. On one side of the lower support bar 200, a fixed vertical end wall 206 is fixed to the table and rises, well above the lower support bar.

Fixedly mounted to the slide 204 at longitudinally spaced positions are a series (4) of nozzle heads indicated generally at 208, partially constituted by a rear plate 210. An intermediate sheetmetal plate 212 of rectangular form, is mounted to the rear plate of each nozzle head 208 for movement up and down in the direction of arrows 214 on rear plate 210. The intermediate plate 212 includes a pair of vertical slots 216 which extend parallel to each other, through which pass lock screws 218. Tapped holes are provided within the rear plate 210 receiving the threaded shanks of lock screws 218. Thus, the intermediate plate may be adjusted vertically up and down and locked in place. A smaller front plate 220, formed of sheetmetal, is provided with two horizontally aligned, laterally spaced slots 222 through which project respectively, lock screws 224. Tapped holes within the intermediate plate 212 receive the threaded shanks of the lock screws 224. By loosening the lock screws 224, the front plate 220 can be shifted horizontally and locked in adjusted position. A bracket 226 mounts to the center of the front plate, a one of the vertical axis liquid adhesive dispensing nozzles 160. Each nozzle 160 includes a liquid adhesive inlet line 228 which receives liquid adhesive from a source indicated schematically by the arrow 230. The nozzle 160 is solenoid operated so as to meter a drop or several drops 238 of adhesive of given preset volume which discharge from the tapered conical dispensing nozzle outlet 232 of nozzle 160. An air hose 234 connects to the conical nozzle outlet 232 and, a blast of compressed air from a source indicated schematically by the arrow 236 is pulsed through compressed air hose 234 after the dispensing of a liquid drop of adhesive or glue onto an aligned notch 3 in the underlying bearing bar 2 to blow out any remnant or residue adhesive within the nozzle discharge outlet 232 thereby preventing a string of glue from following each nozzle head 208 as it is stepped transversely across the underlying array of bearing bars 2 from one bearing bar notch 3 to the transversely aligned notch 3 of the next bar.

Means are provided for simultaneously incrementing all four nozzle heads 208 via a horizontally reciprocating drive bar indicated generally at 240. In that respect, the fixed horizontal end wall 206 of the glue applicating unit 42 carries a C-shaped mount 241 for slidably holding a horizontal drive bar 240 of rectangular cross section, received thereby. The drive bar 240 has one end proximate to one vertical end wall 164. The end wall 164 mounts, on an external face thereof, a hydraulic cylinder 242. The hydraulic cylinder has a pair of ports 244,246 which selectively, alternatively receive hydraulic liquid from a source and return same to a sump as indicated by double-headed arrows 248,250 respectively. A piston rod 252 projects from one end of the hydraulic cylinder 242, and is fixedly coupled to drive bar 240 to reciprocate the drive bar 240 over a predefined distance equal to the lateral spacing between the bearing bars 2 passing through the glue applicating unit 42 at station D. Above the drive bar 240, there is fixedly mounted to the surface 206a of end wall 206 a hold bar 252 which extends parallel to the drive bar.

The front face 240a of the drive bar facing the face of the first plate 210 of each dispensing nozzle assembly 208 is provided with a series of drilled conical holes 254 while, face 252a of the hold bar 252 is provided with a series of similar horizontally, equally spaced conical holes 256. Mounted horizontally to the rear face 210b, of the first, vertical rear plate 210 are a pair of solenoids 260,262, which are vertically aligned and from which project horizontally outwardly, plungers 264,266, respectively at vertical levels corresponding to levels of holes 256,254, respectively. The plungers terminate in conical tips 268 and 270. The plungers 264,266, are spring returned, such that with the solenoids energized, the conical pins are projected axially outwardly from the fixed solenoids 260,262. When projected, the conical pins project into respective ones of the conical holes 256,254, of the hold bar 252, and drive bar 240 respectively. Under a control system which utilizes a microswitch indicated generally at 272, the solenoids of 260,262, for each of nozzle assembly 212 are actuated alternatively. Assuming that each of the nozzle heads 208 are at an extreme right or left nozzle head home position, the solenoid operated dispensing nozzles 160 are momentarily actuated so as to produce a drop 238 of liquid adhesive or glue of a predetermined volume. The drops 238 are discharged out of the conical outlet nozzle 232 onto upwardly open, aligned notches 3 within given bearing bars 2. During such operations, the hold solenoid 260 is energized and its hold pin 268 projects into a given conical hole 256 of the hold bar to maintain the dispensing nozzle head 208 stationary. Subsequent thereto, the hold solenoid 260 is de-energized and the drive solenoid 262 is energized. The vertically aligned, but underlying, drive solenoid drive pin tip 270, projects into a vertically aligned conical hole 254 of the drive bar and a mechanical interlock is made with the drive bar 240. Hydraulic fluid is then provided to the hydraulic cylinder 242 so as to cause the piston rod 252 to extend thereby, driving the drive bar horizontally an incremental distance of 1 inch for example. The result of this is to shift the heads 208 one inch from the initial position. Stepped shifting of the dispensing nozzle 160 from a position of alignment with the notch 3 within a bearing bar 2 having already received its drop or drops of glue or adhesive, to an aligned notch 3 of the immediately adjacent bearing bar 2 is effected and the control system terminates further stepping of the operation of the glue applicating unit 42. Such action continues, bearing bar by bearing bar. For instance, if there are 16 laterally assigned bearing bars, each of the four dispensing heads 208 are incremented to four different laterally spaced adjacent bearing bars 2 and glue is thus applied to all of the 16 aligned notches 3 in the row. The control system may be such that the dispensing heads 208 are incrementally driven in the opposite direction during the next succession of glue drop applications to the next row of notches for the bearing bars 2 after the bearing bars 2, as a group are incremented or stepped 6 inches longitudinally the glue applicating unit 42 from one glue applicating operation to the next. Also, alternatively, the drive bar and hold bar operation can be transmitted to the slide 204 through a single pair of solenoids such as solenoids 260, 262 rather than using solenoids 260, 262 associated with each one of the four nozzle heads 208 as illustrated.

The laterally opposed side walls 164 of the glue applicating unit or end wall 206 support at the top of the unit, cross beam 274, which extends across the table and which is of generally rectangular cross sectional configuration the cross beam 274, mounts on the top face 274a thereof, a series of buttons or brads 276 which project above the top surface and are spaced at equal distances to match the spacing of the bearing bars 2. Fixedly mounted to the slide 204 either by way of a back plate 210 of one of the nozzle heads 208 or rising directly from the slide 204, is a L-shaped support 278, to the head of which is fixed depending microswitch 272. The microswitch 272 includes a switch actuator 279 having a roller on the bottom, as at 280, which rolls along the top surface 274a of cross beam 274. The roller 280 is spring loaded, and the actuator 279 shifts to actuate the microswitch upon depression thereof each time the roller 280 rolls over a brad or button 276. This initiates an electrical control signal to the control panel and effects switching of the solenoids 260,262 for locking the nozzle heads alternately 208 to the drive bar 240 and hold bar 252. The buttons 276 are set so that stoppage of the drive bar aligns the axis of the bearing bars 2 with the vertical axis of the dispensing nozzles 160, thus ensuring that the liquid adhesive drops 238 impact the center of the notches 3 within the bearing bars 2. As may be appreciated, the setup of the glue applicating unit 42 permits ready adjustment in position, both horizontally and vertically, of the liquid adhesive dispensing nozzles 160. Once the front and intermediate plates 212,220 have been positioned and locked, a large number of grating panels may be assembled without change. However, when the lateral spacing between bearing bars 2 or when the thickness of bars 2 changes, the positions of the various liquid adhesive dispensing nozzles 160 must be changed to ensure orientation of the vertical axis of the liquid adhesive dispensing nozzles 160 and the center lines of the bearing bars passing through the apparatus 10.

The hydraulic tie bar press 46 at the succeeding station E, in all respects, is similar to the structure of the first and second hold presses 34, 48, however, the hydraulic tie bar press hydraulic cylinder may be of much greater hydraulic capacity. For instance, in the illustrated embodiment, the hydraulic press tie bar is of a 30-ton capacity since considerable force is required to cam deflect the outwardly flared legs of the inverted U-shaped grating cross bar or tie bar 4 into the similarly configured oblique slots of the notches 3 within the top edges of the bearing bars 2 receiving the same. The schematic representation of FIGS. 1 and 2 is believed to be adequate since the upright, inverted U-shaped frame consisting of, laterally spaced vertical side walls 178 and transverse cross bar or cross beam 179, is adequate to support a pair of laterally spaced, vertical axis hydraulic cylinders 176. One cylinder 176 is mounted to each end of the transversely extending press bar 172. The ends of respective piston rods 174 of the hydraulic cylinders 166, which extend vertically, downwardly and parallel to each other, are fixed to the top of the press bar 172. Hydraulic liquid from a source, is fed selectively to hydraulic feed and removal lines thereof (not shown), FIG. 2 to effect the desired action, simultaneously at both hydraulic cylinders 176, depression or retraction of opposite lateral ends of the press bar 172.

In operation, since the grating assembly machine or apparatus 10 forming the illustrated embodiment, is designed to accept bearing bars of varying thickness, as for instance, 1 inch or 1 3/16 inches and in various lengths ranging from 10 feet to 20 feet and heights of 1 inch to 3 inches, to accommodate for these changes, the liquid adhesive dispensing nozzles 160 may be raised and lowered on the nozzle heads 208, as well as raising or lowering the grooving head. Loading of the bearing bars 2 into loading rack 33 with the leading ends 2a of the bearing bars 2 abutting the stop bar 38 which is in a raised position, is effected by automatic operation or under partial manual operation of an operator standing in front of the apparatus 10, FIG. 1. The grooving head advance direction is towards the rear of the machine, FIG. 1, and the retraction position of the grooving head 110 (and that of the multiple liquid adhesive dispensing nozzles 160) is from the operator transversely across the incremented bearing bars 2. The operator in a preferred program of operation begins the assembly operation only after the hydraulic pumping system and the grooving motors 120, 122, are running. Control is effected manually by depressing pushbuttons on a control panel fronting the operator. The operator depresses the "start" pushbutton and the grooving head 110 begins the first grooving operation by moving towards the operator from the retracted position, FIG. 1. After an initial grooving operation is complete, the operator depresses the "start" pushbutton again. The machine automatically moves the panel, i.e., the array of bearing bars 2 six inches and a second grooving operation begins. This operation continues until the first groove (aligned notches 3) of the panel bearing bars 2 progresses to and is located under the glue applicator dispensing heads 208. As the "start" pushbutton is then depressed again by the operator, the grooving head 110 starts another grooving operation and simultaneously the glue applicator begins dispensing glue droplets 238 on each of the tie bar grooves or notches that are located beneath the dispensing nozzles of the glue head dispensing nozzle 160 of the dispensing heads 208.

After both grooving and gluing operations are complete, the operator again depresses the "start" pushbutton, thus, initiating another six inches of travel of the grating panel by action of the upstream car press 36 acting upon release of bars 2 by the upstream hold press 34. After another 6 inches of travel of the grating panel by cars or blocks 109 of the car press 36, the glue droplet containing bearing bar grooves are located beneath the hydraulic tie bar press 46 at station E. The operator may manually place a tie bar directly onto the bearing bars 2, at right angles thereto, aligned with the grooves or notches 3 between stations D, E. Such action can also be effected automatically by feed of a tie bar 4 beneath the hydraulic tie bar press 46 via feed channel 170 at station E.

Upon placement of the tie bar 4 onto the bearing bars 2 at the tie bar receiving notches, the "start" pushbutton is again depressed by the operator and another cycle is effected. With the panel advanced six inches, the groove head 110 starts its movement from the retracted position side of the apparatus, towards the operator at the advanced position side. The glue heads 212 are advanced from the retracted position towards the advanced position or vice versa for stepping through multiple one inch advancements by alternate reciprocatory movement of the drive bar 240 while simultaneously, the tie bar press lowers its press bar and presses the tie bar into the grooved and glued notches of the bearing bars 2.

The above cycles are continued in accordance with FIG. 9, until the entire panel or preform 6 is completed.

As the trailing edge of the panel preform 6 progresses through the grooving head assembly, a sensor (not shown) detects the panel trailing edge, thus inhibiting its operation. In a preferred mode of operation, the operator can then select an "aligned panel" selector switch (not shown) and a new set of bearing bars can be inserted into the machine 10 as the final assembly of the previous panel 6 is being completed. After all the tie bars 4 have been coupled into the bearing bars of panel preform 6, the operator is then free to see that the completed panel preform 6 may be moved longitudinally to the left out of the machine active components at stations A-F, including the downstream hold press 48 and car press 50. Once free of the second hold press 48 and second car press 50, the completed panel can be manually moved on the rollers or tubes 24 into contact with vertically upright roller conveyor stop bar 198 which is set to the required length of that grating panel.

A sensor (not shown) associated with the stop bar 198 permits a cutoff operation to begin. The completed grating severing apparatus 52 is shifted longitudinally on means 199 to a desired position depending on the length of grating panel 6 and the operator depresses a cutoff "start" pushbutton on the control panel to cause the powered, rotary saw blade 180 to traverse across the panel preform 6 to trim off the bearing bar 2 trailing edges and to permit a trimmed, completed panel to be removed from the roller conveyor onto the unloading conveyor 54 whose height is less than that of the tabletop. As such, a number of completed grating panels may be sequentially stacked onto the unloading conveyor 54 and removed as a completed stack.

Figure 12:
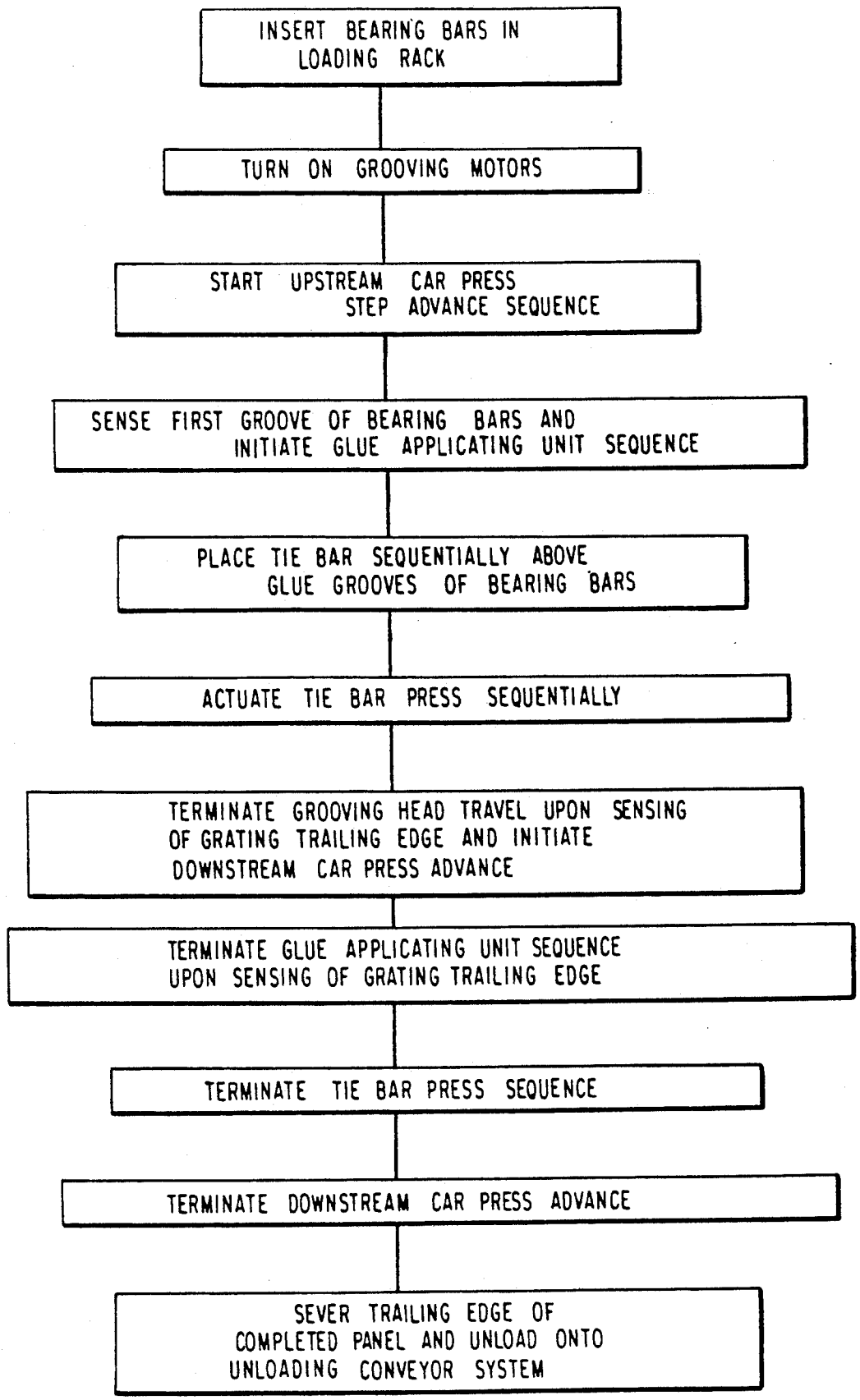
FIG. 12 is a flow chart for apparatus of FIGS. 1-11 inclusive.

The operation of the assembly machine or apparatus as described above is relatively simple and straightforward and follows the sequence of the flow chart or sheet, FIG. 12. Preferably as in the illustrated embodiment, the operator is required to actuate only a few pushbuttons and selected switches and to monitor use of the same when operating the machine. Preferably a programmable controller forms part of the control panel and the controller's logic system effects adequate controlling and sequencing for proper machine operation. Control panel switches and interlocks ensure the desired operation of the machine components or act to shut down the machine, absent proper sequencing. The interlocks basically serve three purposes: 1) to ensure the proper sequencing of the machine; 2) to protect operators and maintenance personnel; and 3) to prohibit the operator from damaging the machine if the wrong control pushbutton is depressed.

The machine as described above, incorporates standard sensors for sensing, either mechanically or electrically, (Hall effect sensors and the like) the position of the elements forming the workpiece (the grating panel or components of machines at the active stations, i.e., grooving heads, dispensing heads, etc.). At least one limit switch sensor is required to detect the presence of bearing bars loaded on the loading rack and having leading ends abutting the raised stop bar 38. Typical components of the system include an advance grooving head/retract grooving head select switch. The operation of the same causes the grooving head to traverse to either the advance or retracted side of the machine depending on the selection made by the operator. "Advance" indicates the item is located on the opposite side from that of the operator and "retracted" indicates the item is located on the operator's side of the machine. In this mode, the grooving head will not traverse in either direction if there are bearing bars located beneath the grooving head.

The advance cutoff head/retract cutoff head select switch causes the cutoff head to traverse to either the advanced or retracted side of the machine depending on the selection made by the operator. This control function permits inspection, adjustment or maintenance on the cutoff head assembly. A flush glue applicator pushbutton permits, when the machine is in a "manual" mode, the opening of the glue applicator glue dispensing heads and the heads will remain open as long as the pushbutton is depressed. This control function is used for compressed air cleaning of the glue dispensing system components when required.

A reset pushbutton is employed in the manual mode and initiates the following:

| | |
|---|---|
| 1. | retracts the cars to the system start position; |
| 2. | raises the hold presses to the up or open position; |
| 3. | resets the glue applicator logic sequence; and |
| 4. | raises the tie bar press to the up or open position. |

Reset is normally employed in the initial setup of the machine when daily production is about to be initiated.

The apparatus or machine 10 may have certain automatic mode operational interlocks. The logic program for the control panel may include as part of the program and described above, the necessity for the grooving motors to be running before a cycle start can be initiated by the operator and prevents machine operation by depression of the "start" pushbutton. An aligned panel selector switch ensures repositioning, i.e., raising of the stop bar 38 to a position in abutment with the ends of the inserted bearing bars for a new bearing bar set, located 3 inches ahead of the center of the grooving blades of the bearing bar grooving unit 40. This selector switch disables the operation of the grooving head 110 as the bearing bars 2 are being inserted into the loading rack 33, but permits the operation of the rest of the machine 10 to continue. When a new panel preform of bearing bars 2, as at 6, is fully loaded, the "align" panel selector switch is turned off enabling the grooving head 110 to join in the automatic operation of the machine.

The "start" pushbutton starts the assembly cycle of the machine and as each cycle is completed, the operator in the embodiment of the invention disclosed depresses the "start" pushbutton to initiate the next cycle. A start cycle can begin only if the machine 10 is in the following position:
1. "auto mode" must be selected;
2. hold press 48 up or, car press 50 up;
3. hold press 34 up;
4. tie bar press 46 up;
5. grooving motors 120,122 on;
6. cutoff cycle must be complete;
7. glue cycle must be complete;
8. tie bar press 46 must be up.

In addition to the eight points above, the grooving head 110 will not sequence unless there is a panel 6 section located beneath the grooving head 110 and the glue applicating unit 42 will not sequence unless there is a panel preform 6 section located beneath the glue applicator heads with grooves or notches 3 aligned therewith.

A "stop" pushbutton (not shown) will stop the operation of the machine when depressed. If depressed in the middle of a cycle, a "manual mode/reset" pushbutton must be depressed to reset all mechanical movements of the machine so that a start can be initiated again.

A start of a cutoff operation pushbutton may be located next to the cutoff unit to the left of the machine on the operator's side. When that pushbutton is depressed, the cutoff cycle begins. The operator must be sure the panel is against the cut-to-length stop bar located on the receiving conveyor. The cutoff operation may be initialized in either the manual or automatic mode of operation as the cutoff apparatus is basically separate from the rest of the assembly machine.

Machine operation for the apparatus 10 as shown in the drawings and described above, may be effected, for example, along the lines described above, in following a sequence as shown by flow diagram, FIG. 9.

The process as set forth therein is continued until the entire panel preform 6 is completed. As the trailing edge of the grating panel 6 passes through the grooving head assembly, the grooving head 110 will stop traveling across the machine when a new cycle is initiated. This will indicate to the operator that the panel 6 trailing edge has passed the grooving head 110. As the operator continues to insert tie bars 4 (or the machine automatically inserts tie bars) and the operator depresses the "start" pushbutton, the panel 6, in a stepwise fashion, will be eventually completed. As the trailing edge of the panel 6 travels pass the glue heads, the glue applicating unit 42 will stop operating and the final tie bar 4 is then inserted either manually or automatically. The "start" pushbutton is again depressed by the operator and the hydraulic tie bar press actuates to complete the panel preform 6 which maybe further stepped forwardly through the machine by the downstream hold press 48 and car press 50 units acting alternatively. However, once the entire panel preform 6 has been completed, a portion thereof will be beneath the hold press, 48 and car press 50 making up station F. With the hold press bar of the hold press, and the car press bar of the car press raised to the up position, the operator can manually pull the completed panel 6 from the upstream stations and move the completed grating into contact against the cut-to-length roller conveyor stop bar. At this point, the operator depresses the cutoff "start" pushbutton on the operator side and the cutoff cycle is started. After that cycle is complete, the cutoff system automatically stops running, the rotary saw blade stops and the finished panel can be manually or otherwise removed from the machine onto the unloading conveyor system. Meanwhile, the operator can begin to insert a new group of bearing bars 2 into loading rack 33 without disrupting the operation of the machine 10. As soon as the new bearing bars 2 are installed, the "align panel" switch can be turned off and the machine will begin to process both panel sections simultaneously. There will exist a short distance between the trailing edge of the first panel and the leading edge of the second panel. This distance is determined by how quickly the operator can insert the new bearing bars 2, however, the operator must make certain that the leading panel preform 6 is cut or trimmed and removed as a completed grating panel from the table 12 conveyor before the following panel preform 6 starts to leave the machine in a stepping process through the second hold press 48 and the second car press 50. If the finished panel is not removed in time, there may be a collision between the two panels.

The foregoing disclosure and description of the invention is illustrative and explanatory thereof in various changes in the size, shape and materials as well as in the details of the illustrated apparatus may be made within the scope of the appended claims without departing from the spirit of the invention.

What is claimed is:

1. An apparatus for assembling fiberglass grating from pultruded first and second sets of mutually parallel, laterally spaced, interlocking fiberglass reinforced molding resin bars with the sets extending transversely to one another, including an underlying set of bearing bars having longitudinally spaced notches within an upper edge thereof, and an overlying set of cross bars fittable to said notches, said apparatus comprising:
   means for supporting a set of bearing bars, in laterally spaced, longitudinal alignment for movement along a path parallel to the axis of said bearing bars;
   means for incrementally advancing said bearing bars in unison as an array periodically along said path in steps equal to a desired spacing between cross bars;
   means for holding said bearing bars stationary in said laterally spaced longitudinal alignment after incremental advancement of said bearing bars;
   means responsive to terminating of each incremental advancement of said bearing bars for sequentially notching the tops of said st of bearing bars at laterally aligned positions for receiving bottoms of said cross bars for interlocked coupling therebetween; and
   means for forcing a cross bar, when extended across laterally aligned notches of said set of laterally spaced bearing bars into said respective laterally aligned notches to mechanically interlockingly couple said cross bar to each of said bearing bars.

2. The apparatus as claimed in claim 1, further comprising:
   means for applying adhesive to said notches after notching said bearing bars and prior to forcing said cross bars into said laterally aligned notches.

3. The apparatus as claimed in claim 1, wherein:
   said cross bars are of inverted U-shape with laterally, outwardly oblique legs, and wherein said notching means comprises means for rotatably supporting a pair of rotary disc saw blades at oppositely oblique angles and so that the blades are offset with respect to each other, such that tips of the rotary blades engage the tops of the bearing bars and form X-shaped grooves within the tops of the bearing bars sized to receive the outwardly oblique legs of the inverted U-shaped cross bars for reception in said grooves.

4. The apparatus as claimed in claim 3, wherein said cross bar legs are resilient; a grooving unit positions said rotary saw blades vertically with respect to the set of bearing bars such that said X-shaped grooves formed by said blades include oppositely beveled cam deflection edges proximate to an upper surface of the bearing bars so that outwardly oblique legs of the inverted U-shaped cross bars are cammed towards each other during initial penetration of the legs of the cross bars into the bearing bar notches by said means for forcing said cross bars, extended across the laterally spaced bearing bars, into said laterally aligned notches; and
   wherein, said mechanical interlocking is effected by deflection of the resilient oblique legs of the inverted U-shaped cross bars into said respective X-shaped grooves of said bearing bar notches.

5. The apparatus as claimed in claim 2, further comprising:
   control means for effecting simultaneously notching of said set of bearing bars at one longitudinally spaced position along said bearing bars and the applying of adhesive to previously formed notches of said set of bearing bars at a downstream position in the direction of incrementing of said set of bearing bars.

6. The apparatus as claimed in claim 1, wherein:
   said means for supporting comprises a vertically upright table and wherein, said incremental advancing means, said notching means, and said forcing means are mounted in positions overlying said table.

7. The apparatus as claimed in claim 6, wherein said table comprises:
   a vertically upright, open frame including laterally spaced, longitudinally extending beams;
   and a plurality of longitudinally spaced, rollers mounted transversely between said open frame beams for rotation about their axis, and forming a horizontal conveyor for low friction support of said set of bearing bars for movement in the longitudinal direction of their axes, over the peripheries of said rollers.

8. The apparatus as claimed in claim 6, further comprising:
   a loading rack bar mounted to said table upstream of said means for notching said tops of the said set of bearing bars and located upstream therefrom, said loading rack bar including a first set of spacing and alignment pins at equal spaced distances extending upwardly therefrom, above the top of said table, and having gaps therebetween corresponding generally to the lateral width of said bearing bars, such that movement of the set of bearing bars longitudinally on the table, is through respective gaps between said spacing and alignment pins of said first set to maintain the bearing bars at predetermined, desired spacing for the grating to be formed by said apparatus.

9. The apparatus as claimed in claim 6, further comprising:
a stop bar, mounted to said table and extending transversely from one side of the table to the other, proximate to said means for notching the tops of the bearing bars, and upstream thereof, and downstream of a loading rack for movement between a first lowered position wherein a top of the stop bar lies below the path of movement of said set of bearing bars; and a second, projected position above said table;
means for shifting said stop bar between said first position and said second position, and into the path of movement of leading ends of said set o bearing bars such that, an operator may manually load the apparatus, with the leading ends o the bearing bars in abutment with the transversely extending stop bar in said second, projected position.

10. The apparatus as claimed in claim 8 further comprising:
means for rotatably mounting said loading rack bar on said table for rotation about its axis; and
a second set of spacing and alignment pins at 90° to the first set of spacing and alignment pins with said second set of alignment pins having gaps which are different from those of said first set of spacing and alignment pins such that by rotation of said bar, said first and second sets of spacing and alignment pins may be selectively projected as a set above the upper surface of the table to permit the apparatus to effect assembly of fiberglass grating having bearing bars of a different thickness.

11. The apparatus as claimed in claim 10, wherein said apparatus further comprises:
means for selectively locking said rotatable loading rack bar in a first position wherein said first et of spacing and alignment pins are vertically upright and a 90° rotated, second position wherein the first set of spacing and alignment pins lie beneath the top surface of the table at a position which does not impede movement of the bearing bars through the gaps between said second set of spacing and alignment pins and said spacing and alignment pins of said second set project above the top of the table.

12. The apparatus as claimed in claim 1, wherein: said holding means comprises a hold press; said hold press being downstream of a said loading rack, and upstream of said notching means;
said hold press comprising risers on opposite sides of a table, said risers extending vertically, upwardly of the top of said table, a hold press cross beam extending transversely across the table and supported by and fixedly mounted to the risers, at least one hydraulic cylinder fixed to the hold press cross beam and having extending therefrom, a vertically, downwardly, retractable piston rod, an underlying transversely extending hold down bar of a length so as to extend across the top of the table; and fixed to said piston rod,
and means for selectively supplying hydraulic fluid to said hydraulic cylinder for causing said piston rod to selectively drive said hold down bar against the tops of said set of bearing bars to frictionally hold said bearing bars stationary in contact with the table during notching of the tops of said bearing bars.

13. The apparatus as claimed in claim 12, wherein:
said means for incrementally bearing bars set, comprises at least one car press positioned in the proximity of said holding means and upstream of said notching means;
said car press comprising means for mounting a car press hold down bar for incremental movement longitudinally of said apparatus, towards and away from said holding means and means for frictionally pressing said car press hold down bar against said set of bearing bars on a table, and means for incrementally moving said car press hold down bar such that, upon release of the holding means and operation of the car press, the set of bearing bars are incremented in unison to permit notching thereof, after termination of each incremental movement of said at least one car press.

14. The apparatus as claimed in claim 13, wherein said at least one car press, comprises:
a pair of short length rails fixedly mounted on opposite sides of the table;
blocks slidably mounted on said rails;
side plates mounted to said blocks, and extending vertically, upwardly therefrom;
a cross beam fixedly mounted to tops of said side plates and forming with said blocks, a U-shaped carriage; and
drive means operatively coupled to said blocks for driving said carriage towards and away from said holding means, to effect limited, incremental step movement of said set of bearing bars when said hold down bar of the car press frictionally engages the underlying set of bearing bars and, said car press carriage is driven away from said holding means in the direction of said notching means.

15. The apparatus as claimed in claim 13, wherein, said car press hold down bar further comprises:
a pad on the bottom surface thereof, facing said set of bearing bars for engagement therewith.

16. The apparatus as claimed in claim 14, wherein said driving means comprises:
a hydraulic cylinder including a piston rod;
operatively coupled to at least one of said blocks.

17. The apparatus as claimed in claim 1, wherein said means for notching the tops of said set of bearing bars at laterally aligned positions comprises:
a bearing bar grooving unit; said bearing bar grooving unit comprising a grooving unit carriage mounted for transverse movement in overlying position of a table, from one lateral side of the table to the other;
means for driving said grooving unit carriage from one side of said table to the other; and
a pair of rotary saw blades mounted for rotation about their axes wherein said blades are oblique to each other and offset from each other in the transverse direction of movement of the carriage such that the blades create X-shaped notches in the tops of said bearing bars during transverse of the grooving unit from one side of the table to the other.

18. The apparatus as claimed in claim 17, wherein said means for driving said grooving unit carriage comprises:
   a pair of sprockets mounted for rotation about horizontal axes to said apparatus, at transversely opposite sides of said table, wherein said sprockets is operatively coupled to an electric motor, a chain operatively engaging said sprockets, whereby energization of said motor, causes said chain to advance over said sprockets, and to drive said grooving unit carriage in at least one direction transversely across said table.

19. The apparatus as claimed in claim 18, wherein said chain has one end fixed to said carriage and an opposite end led over one of said sprockets and being fixed to a vertically raisable and lowerable counterweight, such that the counterweight tends to smooths out the transverse movement of the carriage across the top of said table and provides a biasing force tending to bias said grooving unit carriage in the direction of lowering movement of said counterweight.

20. The apparatus as claimed in claim 17, wherein said grooving unit carriage, comprises:
   a rectangular open grooving head box frame, including a bottom wall; and
   driving motors mounted to said grooving head box frame bottom wall, opposite to each other and offset from each other in the transverse direction of movement of the carriage, wherein each motor has an axis and the axes of the motors are oblique to each other.

21. The apparatus as claimed in claim 2, wherein said means for applying adhesive to said notches comprises:
   a glue applicating unit; glue applicating unit comprising at least one nozzle head mounted above a table, for movement transversely across a table; means for shifting said nozzle head transversely; and
   a liquid adhesive dispensing nozzle mounted on said nozzle head, having a dispensing outlet overlying the set of bearing bars and alignable with the notches and means for incrementally shifting said nozzle head from alignment with a notch on one of said bearing bars to a laterally aligned notch of an adjacent bearing bar, and means for selectively supplying the liquid adhesive to said dispensing nozzle for forcing a predefined volume of liquid adhesive out of said to outlet and into said aligned notch.

22. The apparatus as claimed in claim 21, wherein:
   a track extends transversely across the table from one side thereof to the other at a position downstream of said notching means;
   a metal slide is slidably carried by said track and movable therein, said at least one nozzle head is mounted to said slide, and said glue applicating unit further comprises means for incrementing said nozzle head at distances equal to the distance between notches of laterally adjacent bearing bars.

23. The apparatus as claimed in claim 22, wherein said nozzle head includes:
   a vertically upright rear plate;
   an intermediate, vertical plate of rectangular form, means for mounting said intermediate plate on said vertically upright rear plate for movement of the intermediate plate vertically relative to the rear plate;
   a vertical front plate positioned on said intermediate plate for movement horizontally at right angles to the direction of vertical movement of said intermediate plate on said rear plate, means for locking said intermediate plate at a vertically adjustable position on said rear plate, and means for locking said front plate on said intermediate plate at a horizontally adjusted position; and
   wherein said dispensing nozzle is fixedly mounted to the front of said front plate such that, said dispensing nozzle may be shifted orthogonally, depending on the vertical height and thickness of the bearing bars of the grating.

24. The apparatus as claimed in claim 21, wherein said means for incrementally shifting said at least one nozzle head comprises:
   a fixed hold bar, extending transversely across the top of said table, and having a face thereof facing towards said at least one nozzle head and bearing a series of locking holes at longitudinally spaced positions corresponding to the center line distances between the notches of said set of bearing bars; and
   a drive bar means for supporting a drive bar horizontally above the table and parallel to said fixed hold bar for movement longitudinally in the direction of the longitudinal axis of the drive bar wherein said drive bar has locking holes;
   wherein said at least one nozzle head comprises first and second, vertically aligned solenoids mounted to a surface of the nozzle head facing said fixed hold bar and said drive bar, respectively, and aligned with said respective locking holes within said fixed hold bar and said drive bar; and means for incrementing said drive bar over a distance equal to said center line spacing between laterally aligned notches of adjacent bearing bars and, wherein said solenoid includes plungers projectable towards and away from said nozzle head for selective engagement with the locking holes of respective fixed hold bar and drive bar, and means for alternately energizing said solenoids such that, with said second solenoid plunger engaging one of said locking holes within said drive bar, upon operation of said drive bar incrementing means, said dispensing head shifts from a position where the nozzle outlet is aligned with a notch on one of said bearing bars to a notch on a laterally adjacent bar and, wherein, energization of said first solenoid and deenergization of said second solenoid causes the first solenoid plunger to engage a locking hole on said fixed hold bar, momentarily, vertically aligned with a locking hole of said drive bar.

25. The apparatus as claimed in claim 24, further comprising:
   means for blowing compressed air through said dispensing outlet subsequent to dispensing of each predetermined volume of liquid adhesive for preventing dripping of adhesive from said dispensing nozzle during incrementing of said at least one nozzle head from one given bearing bar notch, to a laterally adjacent notch of a laterally adjacent bearing bar.

26. The apparatus as claimed in claim 21, wherein said at least one nozzle head comprises:
   a plurality of nozzle heads extending generally in alignment with each other laterally across the table; and means for commonly incrementing said plural nozzle heads simultaneously to effect stepped alignment of a plurality of dispensing nozzles, respectively, on said nozzle heads at laterally aligned notches of a plurality of said bearing bars.

27. The apparatus as claimed in claim 24, wherein:
a tip of the plunger of each solenoid is of conical form; and
wherein said locking holes within said fixed hold bar and said movable drive bar are of matching conical form to facilitate alignment of the dispensing outlet of the dispensing nozzle with the corresponding notch within the top of the bearing bar prior to operation of the dispensing nozzle.

28. The apparatus as claimed in claim 24, further comprising:
a plurality of longitudinally spaced projections carried by a transversely extending member across the top of said table, proximate to said at least one nozzle head; and
wherein said nozzle head has fixedly mounted thereto a microswitch including a microswitch actuator having a roller moving along a path of said projections and engageable therewith, such that the actuator shifts to actuate the microswitch as the roller rolls over each projection and initiates an electrical control signal for sequentially deenergizing the second solenoid and for energizing the first solenoid.

29. The apparatus as claimed in claim 1, wherein said means for forcing said cross bar into the laterally aligned notches of said set of bearing bars comprises:
a hydraulic tie bar press, said tie bar press comprising an inverted support means for fixedly mounting a transverse cross beam in a position overlying a table and spaced vertically therefrom;
a pair of vertical axis hydraulic cylinders fixedly mounted to said cross beam and depending therefrom;
a transversely extending tie press bar mounted to ends of piston rods extending from respective hydraulic cylinders; and
means for selectively feeding and removing hydraulic liquid to said hydraulic cylinders for causing depression and retraction of opposite lateral ends of the tie press bar such that, with a cross bar underlying the tie press bar, depression of the tie press bar forcibly drives a cross bar into the aligned notches of the set of bearing bars to lock the cross bars into respective slots of the notches.

30. The apparatus as claimed in claim 21, further comprising:
a cross bar guide channel at to one lateral side of the table to facilitate positioning of a cross bar in a position underlying the tie press bar of the tie bar press.

31. The apparatus as claimed in claim 21, wherein:
said tie bar press is fixedly mounted to the table and is downstream of a means for applying liquid adhesive to the transversely aligned notches of said set of bearing bars.

* * * * *